(12) United States Patent
Balan et al.

(10) Patent No.: US 11,440,999 B2
(45) Date of Patent: Sep. 13, 2022

(54) DE-ESTERIFICATION OF BIOMASS PRIOR TO AMMONIA PRETREATMENT

(71) Applicant: Board of Trustees of Michigan State University, East Lansing, MI (US)

(72) Inventors: Venkatesh Balan, Sugarland, TX (US); Leonardo da Costa Sousa, Brighton, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 475 days.

(21) Appl. No.: 16/029,452

(22) Filed: Jul. 6, 2018

(65) Prior Publication Data

US 2019/0010295 A1  Jan. 10, 2019

Related U.S. Application Data

(60) Provisional application No. 62/529,982, filed on Jul. 7, 2017.

(51) Int. Cl.
*C08H 8/00* (2010.01)
*A23K 10/38* (2016.01)
(Continued)

(52) U.S. Cl.
CPC .............. *C08H 8/00* (2013.01); *A23K 10/37* (2016.05); *A23K 10/38* (2016.05); *B01J 19/0006* (2013.01)

(58) Field of Classification Search
CPC ..... A23K 10/37; A23K 10/38; B01J 19/0006; C08H 8/00
See application file for complete search history.

(56) References Cited

U.S. PATENT DOCUMENTS 2,220,624 A  11/1940  Sherrard et al.
3,951,734 A   4/1976  DeHaas et al.
(Continued)

FOREIGN PATENT DOCUMENTS

BR  102018004591-1 A2  8/2018
CA           2573046 A1  1/2006
(Continued)

OTHER PUBLICATIONS

Cheng et al., Oxidative Lime Pretreatment of High-Lignin Biomass, Applied Biochemistry and Biotechnology, vol. 94, 2001, p. 1-28. (Year: 2001).*

(Continued)

*Primary Examiner* — Walter A Moore
(74) *Attorney, Agent, or Firm* — Westman, Champlin & Koehler, P.A.; Visala C. Goswitz

(57) ABSTRACT

A method is provided for pretreating cellulosic or lignocellulosic biomass comprising de-esterifying the biomass with an alkali treatment to produce de-esterified biomass; and pretreating the de-esterified biomass with ammonia to produce de-esterified ammonia pretreated biomass. In various embodiments, the de-esterified ammonia pretreated biomass has an amide concentration ranging from about 0.04 to about 25 mg/g biomass. In other embodiments, the amide concentration is no more than 0.04 mg/g biomass. Various ammonia pretreatment processes may be used, including liquid or gaseous ammonia pretreatments, including, but not limited to, liquid ammonium hydroxide pretreatments, various AFEX pretreatments, with or without biomass densification, and various cellulosic conversion pretreatments including "COBRA" pretreatments. Products (e.g., animal feed) and systems are also disclosed.

16 Claims, 7 Drawing Sheets
(1 of 7 Drawing Sheet(s) Filed in Color)

(51) Int. Cl.
*A23K 10/37* (2016.01)
*B01J 19/00* (2006.01)

(56) References Cited

U.S. PATENT DOCUMENTS

| | | | |
|---|---|---|---|
| 4,064,276 | A | 12/1977 | Conradsen et al. |
| 4,263,744 | A | 4/1981 | Stoller |
| 4,370,351 | A | 1/1983 | Harper |
| 4,526,791 | A | 7/1985 | Young |
| 4,589,334 | A | 5/1986 | Andersen |
| 4,600,590 | A | 7/1986 | Dale |
| 4,848,026 | A | 7/1989 | Dunn-Coleman et al. |
| 4,871,370 | A | 10/1989 | Katsu et al. |
| 5,037,663 | A | 8/1991 | Dale |
| 5,047,332 | A | 9/1991 | Chahal |
| 5,370,999 | A | 12/1994 | Stuart |
| 5,736,032 | A | 4/1998 | Cox et al. |
| 6,106,888 | A | 8/2000 | Dale et al. |
| 6,176,176 | B1 | 1/2001 | Dale et al. |
| 6,524,848 | B2 | 2/2003 | McNelly |
| 7,371,926 | B2 | 5/2008 | Sticklen et al. |
| 7,494,675 | B2 | 2/2009 | Abbas et al. |
| 7,494,792 | B2 | 2/2009 | Warywoda et al. |
| 7,585,652 | B2 | 9/2009 | Foody et al. |
| 7,771,565 | B2 | 8/2010 | Kirov et al. |
| 7,901,511 | B2 | 3/2011 | Griffin et al. |
| 7,910,338 | B2 | 3/2011 | Hennessey et al. |
| 7,915,017 | B2 | 3/2011 | Dale |
| 8,367,378 | B2 | 2/2013 | Balan et al. |
| 8,394,611 | B2 | 3/2013 | Dale et al. |
| 8,419,900 | B2 | 4/2013 | Baba et al. |
| 8,444,925 | B2 | 5/2013 | Baba |
| 8,673,031 | B2 | 3/2014 | Dale et al. |
| 8,771,425 | B2 | 7/2014 | Dale |
| 8,945,245 | B2 | 2/2015 | Bals et al. |
| 8,968,515 | B2 | 3/2015 | Balan et al. |
| 9,039,792 | B2 | 5/2015 | Dale et al. |
| 9,458,482 | B2 | 10/2016 | Bals et al. |
| 9,644,222 | B2 | 5/2017 | Balan et al. |
| 9,650,657 | B2 | 5/2017 | Chundawat et al. |
| 10,202,660 | B2 | 2/2019 | Balan et al. |
| 10,457,810 | B2 | 10/2019 | Dale et al. |
| 10,730,958 | B2 | 8/2020 | Balan et al. |
| 2003/0044951 | A1 | 3/2003 | Sporleder et al. |
| 2006/0130396 | A1 | 6/2006 | Werner |
| 2006/0177917 | A1 | 8/2006 | Warzywoda et al. |
| 2007/0031918 | A1 | 2/2007 | Dunson, Jr. et al. |
| 2007/0037259 | A1 | 2/2007 | Hennessey et al. |
| 2007/0192900 | A1 | 8/2007 | Sticklen |
| 2007/0287795 | A1 | 12/2007 | Huda et al. |
| 2008/0008783 | A1 | 1/2008 | Dale |
| 2008/0256851 | A1 | 10/2008 | Lumb |
| 2008/0280236 | A1 | 11/2008 | Wright |
| 2009/0011474 | A1 | 1/2009 | Balan et al. |
| 2009/0042259 | A1 | 2/2009 | Dale et al. |
| 2009/0053770 | A1 | 2/2009 | Hennessey et al. |
| 2009/0053771 | A1 | 2/2009 | Dale et al. |
| 2009/0093027 | A1 | 4/2009 | Balan et al. |
| 2009/0178671 | A1 | 7/2009 | Ahring et al. |
| 2009/0318670 | A1 | 12/2009 | Dale et al. |
| 2010/0159521 | A1 | 6/2010 | Cirakovic et al. |
| 2010/0267999 | A1 | 10/2010 | Lau et al. |
| 2011/0192559 | A1 | 8/2011 | Venkatesh et al. |
| 2011/0201091 | A1 | 8/2011 | Dale |
| 2011/0300269 | A1 | 12/2011 | Dale et al. |
| 2012/0064574 | A1 | 3/2012 | Tokuyasu et al. |
| 2012/0085505 | A1 | 4/2012 | Sabourin |
| 2012/0111322 | A1* | 5/2012 | Mahamuni ............... B01J 19/10 127/46.1 |
| 2012/0125548 | A1 | 5/2012 | Cohen |
| 2012/0187228 | A1 | 7/2012 | Camp et al. |
| 2013/0196398 | A1* | 8/2013 | Bals ..................... C12P 7/10 435/160 |
| 2013/0244293 | A1 | 9/2013 | Balan et al. |
| 2013/0247456 | A1 | 9/2013 | Dale et al. |
| 2014/0178944 | A1* | 6/2014 | Parekh .................... C12P 19/02 435/99 |
| 2015/0087030 | A1 | 3/2015 | Jain et al. |
| 2017/0145456 | A1* | 5/2017 | Sankh ..................... C12P 19/02 |
| 2018/0258190 | A1 | 9/2018 | Balan et al. |

FOREIGN PATENT DOCUMENTS

| | | |
|---|---|---|
| CA | 2610797 A1 | 12/2006 |
| CA | 2752604 A1 | 8/2010 |
| CA | 2760840 C | 12/2014 |
| CA | 2870758 C | 1/2018 |
| CN | 100999740 A | 7/2007 |
| CN | 101223273 A | 7/2008 |
| CN | 102597247 A | 7/2012 |
| DE | 20301645 U1 | 4/2003 |
| EP | 1247781 A2 | 10/2002 |
| EP | 1690944 A1 | 8/2006 |
| EP | 2411492 B1 | 10/2014 |
| GB | 1310835 A | 3/1973 |
| GB | 1381728 A | 1/1975 |
| GB | 2122864 A | 1/1984 |
| IN | 249187 | 10/2011 |
| IN | 9645/DELPN/2011 A | 2/2013 |
| JP | 2008-161125 A | 7/2008 |
| JP | 2011160753 A | 8/2011 |
| RU | 2215755 C1 | 11/2003 |
| WO | 198500133 A1 | 1/1985 |
| WO | 200061858 A1 | 10/2000 |
| WO | 200132715 A1 | 5/2001 |
| WO | 200237981 A2 | 5/2002 |
| WO | 2007005918 A2 | 1/2007 |
| WO | 2007005918 A3 | 1/2007 |
| WO | 2007130337 A1 | 11/2007 |
| WO | 2008020901 A2 | 2/2008 |
| WO | 2009045527 A1 | 4/2009 |
| WO | 2010098408 A1 | 9/2010 |
| WO | 2010098409 A1 | 9/2010 |
| WO | 2010147218 A1 | 12/2010 |
| WO | 2011028543 A2 | 3/2011 |
| WO | 2011046818 A2 | 4/2011 |
| WO | 2011133571 A2 | 10/2011 |
| WO | 2011133571 A3 | 10/2011 |
| WO | 2012012594 A1 | 1/2012 |
| WO | 2012071312 A2 | 5/2012 |
| WO | 2012088429 A2 | 6/2012 |

OTHER PUBLICATIONS

Teymouri et al., Ammonia Fiber Explosion Treatment of Corn Stover, Applied Biochemistry and Biotechnology, p. 951-963. (Year: 2004).*
2,4-D—Identification, toxicity, use, water pollution potential, ecological toxicity and regulatory information, PAN Pesticides Database-Chemicals, Jul. 6, 2018, 11 pages.
Acetamide, IPCS Inchem, Jul. 1997, 2 pages, ICSC 0233, http://www.inchem.org/documents/icsc/icsc/eics0233.htm.
Acetamide, IPCS Inchem, 3 pages, https://www.yumpu.com/en/document/view/13829650/acetamide-acetic-acid-amide-ethanamide-methane-usp.
Acetamide, 1992, 2 pages, 60-35-5, https://www.epa.gov/sites/production/files/2016-09/documents/acetamide.pdf.
Chen, et al., A highly efficient dilute alkali deacetylation and mechanical (disc) refining process for the conversion of renewable biomass to lower cost sugars, Biotechnology and Biofuels, 2014, 12 pages, vol. 7, No. 98.
Chen, et al., Improved Xylan Hydrolysis of Corn Stover by Deacetylation with High Solids Dilute Acid Pretreatment, I&EC research, Ind. Eng. Chem., 2012, p. 70-76, vol. 51, American Chemical Society.
Humpula, et al., Rapid quantification of major reaction products formed during thermochemical pretreatment of ignocellulosic biomass using GC-MS, Journal of Chromatography B, 2011, p. 1018-1022, vol. 879, Elsevier B.V.
Zhang, et al., Newly Developed Compacted Biomass with Recycling Ammonia (COBRA) Pretreatment Process, May 2, 2018, University of Houston, 26 pages.

(56) References Cited

OTHER PUBLICATIONS

First Examination Report for corresponding Indian Patent Application No. 201814008293, dated Nov. 4, 2020.
Mittal et al., "Effects of Alkaline or Liquid-Ammonia Treatment on Crystalline Cellulose: Changes in Crystalline Structure and Effects on Enzymatic Digestibility", Biotechnology for Biofuels, 2011, 16 pages, vol. 4, No. 41.
Silva, F., Obtenção Insumos Químicos a partir do Aproveitamento Integral do Bagaço de Cana, 1995, 120 pages.
Singhania et al., "Advancement and Comparative Profiles in the Production Technologies Using Solid-State and Submerged Fermentation for Microbial Cellulases", Enzyme and Microbial Technology, 2010, pp. 541-549, vol. 46.
Sluiter et al., "Determination of Sugars, Byproducts, and Degradation Products in Liquid Fraction Process Samples", Technical Report, Jan. 2008, 14 pages.
Sousa et al., "Centralized Low-Severity EA Treatment Can Be Integrated With the AFEX-Based Depots to Significantly Reduce Enzyme Requirements in the Biorefinery", Great Lakes Bioenergy, Apr.-May 2016, SIMB Meeting at New Orleans, 1 page.
Sousa et al., "Next-Generation Ammonia Pretreatment Enhances Cellulosic Biofuel Production", Energy & Environmental Science, 2016, pp. 1215-1223, vol. 9.
Stelte et al., "Recent Developments in Biomass Pelletization—A Review", Bioresources, 2012, pp. 4451-4490, vol. 7, No. 3.
Sun et al., "Hydrolysis of Lignocellulosic Materials for Ethanol Production: A Review", Bioresource Technology, 2002, pp. 1-11, vol. 83.
Tabil et al., "Chapter 18: Biomass Feedstock Pre-Processing—Part 1: Pre-Treatment", Biofuel's Engineering Process Technology, 2011, 29 pages.
Tabil et al., "Chapter 19: Biomass Feedstock Pre-Processing—Part 2: Densification", Biofuel's Engineering Process Technology, 2011, 27 pages.
Teymouri et al., "Optimization of the Ammonia Fiber Explosion (AFEX) Treatment Parameters for Enzymatic Hydrolysis of Corn Stover", Bioresource Technology, 2005, pp. 2014-2018, vol. 96.
Theerarattananoon et al., "Effects of the Pelleting Conditions on Chemical Composition and Sugar Yield of Corn Stover, Big Bluestem, Wheat Straw, and Sorghum Stalk Pellets", Bioprocess Biosystems Engineering, 2012, pp. 615-623, vol. 35.
"Topic 3 R&D on Processes for Solid, Liquid and Gaseous Fuels from Biomass", 20th European Biomass Conference and Exhibition, 2012, 26 pages.
Tumuluru et al., "A Review on Biomass Densification Technologies for Energy Application", Idaho National Laboratory, Aug. 2010, 96 pages.
Tumuluru et al., "A Review of Biomass Densification Systems to Develop Uniform Feedstock Commodities for Bioenergy Application", Biofuels Bioproducts & Biorefining, 2011, pp. 683-707, vol. 6.
Vassilev et al., "An Overview of the Chemical Composition of Biomass", Fuel, 2010, pp. 913-933, vol. 89.
Vennestrøm et al., "Beyond Petrochemicals: The Renewable Chemicals Industry", Angewandte Chemie International Edition, 2011, pp. 10502-10509, vol. 50.
Wada et al., "Polymorphism of Cellulose I Family: Reinvestigation of Cellulose IVI", Biomacromolecules, 2004, pp. 1385-1391, vol. 5.
Wada et al., "Neutron Crystallographic and Molecular Dynamics Studies of the Structure of Ammonia-Cellulose I: Rearrangement of Hydrogen Bonding During the Treatment of Cellulose with Ammonia", Cellulose, 2011, pp. 191-206, vol. 18.
Wahlco, Inc. "Ammonia Systems for SCR Applications", 2001, 4 pages.
Warzywoda et al., "Production and Characterization of Cellulolytic Enzymes from Trichoderma reesei Grown on Various Carbon Sources", Bioresource Technology, 1992, pp. 125-130, vol. 39.
Wilson, J., "A Cost Analysis for the Densification and Transportation of Cellulosic Biomass for Ethanol Production", Thesis, 2009, 86 pages.
Yatsu et al., "Conversion of Cellulose I to Stable Cellulose III", Textile Research Journal, 1986, 8 pages, vol. 56.
Yoon et al., "Ammonia-Recycled Percolation Process for Pretreatment of Biomass Feedstock", Applied Biochemistry and Biotechnology, 1995, pp. 5-19, vol. 51/52.
Yul et al., "Structure Conversions of Cellulose III1 Crystal Models in Solution State: A Molecular Dynamics Study", Cellulose, 2010, pp. 679-691, vol. 17.
Zhao et al., "Organosolv Pretreatment of Lignocellulosic Biomass for Enzymatic Hydrolysis", Applied Microbiology Biotechnology, 2009, pp. 815-827, vol. 82.
Zugenmaier, P., "Conformation and Packing of Various Crystalline Cellulose Fibers", Progress in Polymer Science, 2001, pp. 1341-1417, vol. 26.
"Production Techniques to Produce Herbal Extract", Herbal Article-Production Techniques for Herbal Extracts, Oct. 31, 2014, 4 pages.
Office Action received for Chinese Patent Patent Application No. 200780025394.4, dated Oct. 13, 2011, 11 pages.
Office Action received for Chinese Patent Application No. 200780025394.4, dated Oct. 30, 2012, 5 pages.
Office Action received for Chinese Patent Application No. 20110097994.X, dated Jul. 30, 2012, 25 pages.
First Office Action received for Chinese Patent Application No. 201180026819.X, dated Mar. 14, 2014, 22 pages.
Third Office Action received for Chinese Patent Application No. 201180026819.X, dated Apr. 16, 2014, 9 pages.
Fourth Office Action received for Chinese Patent Application No. 201180026819.X, dated Nov. 4, 2015, 14 pages.
Notice of Decision to Grant received for Chinese Patent Application No. 201180026819.X, dated Apr. 20, 2016, 2 pages.
Second Office Action received for Chinese Application No. 201180026819.X, dated Nov. 20, 2014, 17 pages.
Adapa et al., "Compression Characteristics of Selected Ground Agricultural Biomass", Agricultural Engineering International: the CIGR Ejournal, Manuscript 1347, Jun. 2009, 19 pages, vol. XI.
Adapa et al., "Factors Affecting the Quality of Biomass Pellet for Biofuel and Energy Analysis of Pelleting Process", International Journal of Agricultural & Biological Engineering, Jun. 2013, pp. 1-12, vol. 6. No. 2.
Agudelo et al., "Steam Explosion Pretreatment of Triticale (X Triticosecale Wittmack) Straw for Sugar Production", New Biotechnology, Jan. 2016, pp. 153-163, vol. 33, No. 1.
Alizadeh et al., "Pretreatment of Switchgrass by Ammonia Fiber Explosion (AFEX)", Applied Biochemistry and Biotechnology, 2005, 9 pages, vol. 121-124.
Alvira et al., "Pretreatment Technologies for an Efficient Bioethanol Production Process Based on Enzymatic Hydrolysis: A Review", PubMed, Jul. 2010, pp. 4851-4861, vol. 101.
Bagga et al., "Evidence for the Occurence of Polyamine Oxidase in the Dicotyledonous Plant *Medicago sativa* L. (Alfalfa)", Plant Cell Reports, 1991, pp. 550-554, vol. 10.
Balan et al., "Enzymatic Digestibility and Pretreatment Degradation of AFEX-Treated Hardwoods (*Populus nigra*)", Biotechnology Progress, 2009, pp. 365-375, vol. 25, No. 2.
Belgacem et al., "Organosolv Lignin as a Filler in Inks, Varnishes and Paints", Industrial Crops and Products, 2003, pp. 145-153, vol. 18.
Bergner et al., "Archives of Animal Nutrition", Akademie-Verlag Berlin, 1980, 19 pages, vol. 30.
Biely et al., "Towards Enzymatic Breakdown of Complex Plant Xylan Structures: State of the Art", Biotechnology Advances, 2010, pp. 1260-1274, vol. 34.
Bonner et al., "Impact of Sequential Ammonia Fiber Expansion (AFEX) Pretreatment and Pelletization on the Moisture Sorption Properties of Corn Stover", Drying Technology: An International Journal, 2015, pp. 1768-1778, vol. 33.
Preliminary Rejection received for Brazilian Patent Application No. BR102018004591-1, dated Mar. 10, 2019, 7 pages.
Campbell et al., "A Packed Bed Ammonia Fiber Expansion Reactor System for Pretreatment of Agricultural Residues at Regional Depots", Biofuels, 2013, pp. 23-34, vol. 4, No. 1.
Carolan et al., "Technical and Financial Feasibility Analysis of Distributed Bioprocessing Using Regional Biomass Pre-Processing

(56) References Cited

OTHER PUBLICATIONS

Centers", Journal of Agricultural & Food Industrial Organization, 2007, 29 pages, vol. 5, Article 10.
Cen et al., "Production of Cellulase by Solid-State Fermentation", Advances in Biochemical Engineering/Biotechnology, 1999, pp. 69-92, vol. 65.
Chahal, D., "Bioconversion of Hemicelluloses Into Useful Products in an Integrated Process for Food/Feed and Fuel (Ethanol) Production from Biomass", Biotechnology and Bioengineering Symp., 1984, pp. 425-433, No. 14.
Chahal et al., "Production of Cellulase in Solid-State Fermentation with Trichoderma reesei MCG 80 on Wheat Straw", Applied Biochemistry and Biotechnology, 1996, pp. 433-442, vol. 57/58.
Chang, S., "The World Mushroom Industry: Trends and Technological Development", International Journal of Medicinal Mushrooms, 2006, pp. 297-314, vol. 8.
Chen et al., "A Highly Efficient Dilute Alkali Deacetylation and Mechanical (Disc) Refining Process for the Conversion of Renewable Biomass to Lower Cost Sugars", Biotechnology for Biofuels, 2014, 12 pages, vol. 7, No. 98.
Chundawat, S., "Ultrastructural and Physicochemical Modifications Within Ammonia Treated Lignocellulosic Cell Walls and Their Influence on Enzymatic Digestibility: vol. 1", Chemical Engineering, 2009, 230 pages.
Chundawat et al., "Multifaceted Characterization of Cell Wall Decomposition Products Formed During Ammonia Fiber Expansion (AFEX) and Dilute Acid Based Pretreatments", Bioresource Technology, 2010, pp. 8429-8438, vol. 101.
Chundawat et al., "Restructing the Crystalline Cellulose Hydrogen Bond Network Enhances its Depolymerization Rate", Journal of The American Chemical Society, 2011, pp. 11163-11174, vol. 133.
Chundawat et al., "Proteomics-based Compositional Analysis of Complex Cellulase-Hemicellulase Mixtures", Journal of Proteome Research, 2011, pp. 4365-4372, vol. 10.
Ciolacu et al., "Studies Concerning the Accessibility of Different Allomorphic Forms of Cellulose", Cellulose, 2012, pp. 55-68, vol. 19.
Corma et al., "Chemical Routes for the Transformation of Biomass Into Chemicals", Chemical Reviews, 2007, pp. 2411-2502, vol. 107.
Dale et al., "Extrusion Processing for Ammonia Fiber Explosion (AFEX)", Applied Biochemistry and Biotechnology, 1999, pp. 35-45, vol. 77-79.
Dale et al., "Chapter 2 Biomass Refining Global Impact—The Biobased Economy of the 21st Century", Biorefineries—Industrial Processes and Products, 2006, pp. 41-66, vol. 1.
Deshusses, M., "Biological Waste Air Treatment in Biofilters", Environmental Biotechnology, 1997, pp. 335-339, vol. 8.
Eriksson et al., "A Model Explaining Declining Rate in Hydrolysis of Lignocellulose Substrates with Cellobiohydrolase I (Cel7A) and Endoglucanase I (Cel7B) of Trichoderma reesei", Applied Biochemistry and Biotechnology, 2002, pp. 41-60, vol. 101.
Farrell et al., "Ethanol Can Contribute to Energy and Environmental Goals", Science, Jan. 27, 2006, 5 pages, vol. 311.
Fischer et al., "Nitrogenous Fertilizers From Lignins—A Review", Chemical Modification, Properties, and Usage of Lignin, 2002, pp. 167-198.
Garcia-Huante et al., "The Thermophilic Biomass-Degrading Fungus Thielavia terrestris Co3Bag1 Produces a Hyperthermophilic and Thermostable β-1,4-Xylanase with Exo- and Endo-activity", Extremophiles, 2017, pp. 175-186, vol. 21.
Gibson, L., "The Hierarchical Structure and Mechanics of Plant Materials", Journal of The Royal Society Interface, Aug. 8, 2012, 19 pages.
Gupta et al., "Fungal Enzymes for Bio-Products from Sustainable and Waste Biomass", Apr. 22, 2016, 38 pages.
Guragain et al., "Evaluation of Pelleting as a Pre-processing Step for Effective Biomass Deconstruction and Fermentation", Biochemical Engineering Journal, 2013, pp. 186-207, vol. 77.
Habibi et al., "Optimization of Cellouronic Acid Synthesis by TEMPO-mediated Oxidation of Cellulose III from Sugar Beet Pulp", Cellulose, 2008, pp. 177-185, vol. 15.
Himmel et al., "Biomass Recalcitrance: Engineering Plants and Enzymes for Biofuels Production", Science, Feb. 9, 2007, 5 pages, vol. 315.
Igarashi et al., "Activation of Crystalline Cellulose to Cellulose IIII Results in Efficient Hydrolysis by Cellobiohydrolase", FEBS Journal, 2007, pp. 1785-1792, vol. 274.
International Preliminary Report on Patentability received for PCT Patent Application No. PCT/US2010/046525, dated Feb. 28, 2012, 5 pages.
Ishikawa et al., "Determination of Parameters in Mechanical Model for Cellulose III Fibre", Polymer, 1998, pp. 1875-1878, vol. 39, No. 10.
International Search Report and Written Opinion received for PCT Patent Application No. PCT/US2007/010415, dated Oct. 11, 2007, 5 pages.
International Search Report and Written Opinion received for PCT Patent Application No. PCT/US2010/046525, dated Apr. 29, 2011, 9 pages.
International Search Report and Written Opinion received for PCT Patent Application No. PCT/US2011/033079, dated Nov. 22, 2011, 10 pages.
International Search Report and Written Opinion received for PCT Patent Application No. PCT/US2011/061617, dated Jun. 8, 2012, 10 pages.
International Search Report and Written Opinion received for PCT Patent Application No. PCT/US2011/066868, dated Sep. 19, 2012, 6 pages.
International Preliminary Report on Patentability received for PCT Patent Application No. PCT/US2011/033079, dated Nov. 1, 2012, 7 pages.
Iyer et al., "Ammonia Recycled Percolation Process for Pretreatment of Herbaceous Biomass", Applied Biochemistry and Biotechnology, 1996, pp. 121-132, vol. 57/58.
Kadla et al., "Lignin-based Carbon Fibers for Composite Fiber Applications", Carbon, 2002, pp. 2913-2920, vol. 40.
Kaliyan et al., "Roll Press Briquetting and Pelleting of Corn Stover and Switchgrass", American Society of Agricultural and Biological Engineers, 2009, pp. 543-555, vol. 52, No. 2.
Kamm et al., "Chapter 1: Biorefinery Systems—An Overview", Biorefineries—Industrial Processes and Products, 2006, 39 pages.
Karlsson et al., "Enzymatic Degradation of Carboxymethyl Cellulose Hydrolyzed by the Endoglucanases Cel5A, Cel7B, and Cel45A from Humicola insolens and Cel7B, Cel12A and Cel45Acore from Trichoderma reesei", Biopolymers, 2002, pp. 32-40, vol. 63, No. 1.
Karlsson et al., "Enzymatic Properties of the Low Molecular Mass Endoglucanases Cel12A (Eg III) and Cel45A (EG V) of Trichoderma reesei", Journal of Biotechnology, 2002, pp. 63-78, vol. 99.
Kim et al., "Pretreatment of Corn Stover by Aqueous Ammonia", Bioresource Technology, 2003, pp. 39-47, vol. 90.
Kim et al., "Chapter 6: Pretreatment of Biomass by Aqueous Ammonia for Bioethanol Production", Biofuels, Methods and Protocols, Methods in Molecular Biology, 2009, pp. 79-91, vol. 581.
Klemm et al., "Chapter 2: General Considerations on Structure and Reactivity of Cellulose", Comprehensive Cellulose Chemistry: vol. I: Fundamentals and Analytical Methods, Wiley-VHC, 1998, 21 pages.
Krishnan et al., "Alkali-Based AFEX Pretreatment for the Conversion of Sugarcane Bagasse and Cane Leaf Residues to Ethanol", Biotechnology and Bioengineering, 2010, pp. 441-450, vol. 107, No. 3.
Kubicek et al., "Enzymatic Deconstruction of Plant Biomass by Fungal Enzymes", Current Opinion in Chemical Biology, 2016, pp. 51-57, vol. 35.
Kumar et al., "Methods for Pretreatment of Lignocellulosic Biomass for Efficient Hydrolysis and Biofuel Production", Industrial & Engineering Chemistry Research, 2009, 18 pages.
Kumar et al., "Does Densification Influence the Steam Pretreatment and Enzymatic Hydrolysis of Softwoods to Sugars?", Bioresource Technology, 2012, pp. 190-198, vol. 121.

(56) References Cited

OTHER PUBLICATIONS

Lamers et al., "Techno-economic Analysis of Decentralized Biomass Processing Depots", Bioresource Technology, 2012, pp. 205-213, vol. 194.
Lee et al., "Efficiences of Acid Catalysts in the Hydrolysis of Lignocellulosic Biomass Over a Range of Combined Severity Factors", Bioresource Technology, 2011, pp. 5884-5890, vol. 102.
Lewin et al., "The Effect of Liquid Anhydrous Ammonia in the Structure and Morphology of Cotton Cellulose", Journal of Polymer Science: Part C, 1971, pp. 213-229, No. 36.
Li et al., "Process Optimization to Convert Forage and Sweet Sorghum Bagasse to Ethanol Based on Ammonia Fiber Expansion (AFEX) Pretreatment", Bioresource Technology, 2010, pp. 1285-1292, vol. 101.
Li et al., "Responses of Biomass Briquetting and Pelleting to Water-Involved Pretreatments and Subsequent Enzymatic Hydrolysis", Bioresource Technology, 2014, pp. 54-62, vol. 151.
Lynd et al., "Microbial Cellulose Utilization: Fundamentals and Biotechnology", Microbiology and Molecular Biology Reviews, Sep. 2002, pp. 506-577, vol. 66, No. 3.
Mani et al., "Grinding Performance and Physical Properties of Wheat and Barley Straws, Corn Stover and Switchgrass", Biomass & Bioenergy, 2004, pp. 339-352, vol. 27.
Mellerowicz et al., "Unravelling Cell Wall Formation in the Woody Dicot Stem", Plant Molecular Biology, 2001, pp. 239-274, vol. 47.
Miller et al., "Phase I Biomass Enhanced Refined Lignite Demonstration Project", Dec. 15, 2008, 24 pages.
Mittal et al., "Ammonia Pretreatment of Corn Stover Enables Facile Lignin Extraction", ACS Sustainable Chemistry & Engineering, 2017, pp. 2544 2561, vol. 5.
Mohan et al., "Pyrolysis of Wood/Biomass for Bio-oil: A Critical Review", Energy & Fuels, 2006, pp. 848-889, vol. 20.
Mohanram et al., "Novel Perspectives for Evolving Enzyme Cocktails for Lignocellulose Hydrolysis in Biorefineries", Sustainable Chemical Processes, 2013, 12 pages, vol. 1, No. 15.
Mokomele et al., "Ethanol Production Potential from AFEXTM and Steam-Exploded Sugarcane Residues for Sugarcane Biorefineries", Biotechnology for Biofuels, 2018, 21 pages, vol. 11, No. 127.
Mokomele et al., "Using Steam Explosion or AFEXTM to Produce Animal Feeds and Biofuel Feedstocks in a Biorefinery Based on Sugarcane Residues", Biofuels, Bioproducts & Biorefining, 2018, pp. 978-996, vol. 12.
Moniruzzaman et al., "Enzymatic Hydrolysis of High-Moisture Corn Fiber Pretreated by AFEX and Recovery and Recycling of the Enzyme Complex", Applied Biochemistry and Biotechnology, 1997, pp. 113-126, vol. 67.
Mosier et al., "Features of Promising Technologies for Pretreatment of Lignocellulosic Biomass", Bioresource Technology, 2005, pp. 673-686, vol. 96.
Office Action received for Mexican Patent Application No. MX/a/2011/012357, dated Mar. 13, 2013, 1 page.
Office Action received for Mexican Patent Application No. MX/a/2012/012149, dated Aug. 7, 2015, 3 pages.
Office Action received for Mexican Patent Application No. MX/a/2012/012149, dated Mar. 18, 2016, 2 pages.
Nenkova et al., "Production of Phenol Compounds by Alkaline Treatment of Technical Hydrolysis Lignin and Wood Biomass", Chemistry of Natural Compounds, 2008, pp. 182-185, vol. 44, No. 2.
Nwodo et al., "Xylanase Production of Aspergillus niger and Penicillium chrysogenum from Ammonia Pretreated Cellulosic Waste", Research Journal of Microbiology, 2008, pp. 246-253, vol. 3, No. 4.
Owen et al., "An Infrared Study of the Effect of Liquid Ammonia on Wood Surfaces", Journal of Molecular Structure, 1989, pp. 435-449, vol. 198.
Perez et al., "TEMPO-Mediated Oxidation of Cellulose III", Biomacromolecules, 2003, pp. 1417-1425, vol. 4.
Perry, J., "Chemical Engineers' Handbook: Reactor Kinetics and Reactor Design", 1963, 6 pages, McGraw-Hill, Inc.
Sin et al., "Purification and Characterization of Recombinant Endoglucanase of Trichoderma reesei Expressed in *Saccharomyces cerevisiae* with Higher Glycosylation and Stability", Protein Expression & Purification, 2008, pp. 162-167, vol. 58.
Raj et al., "Fate of Liquid Ammonia Spilled Onto Water", Environmental Science & Technology, 1978, pp. 1422-1425, vol. 12, No. 13.
Ray et al., "Effect of Pelleting on the Recalcitrance and Bioconversion of Dilute-Acid Pretreated Corn Stover Under Low- and High-Solids Conditions", Biofuels, 2013, pp. 271-284, vol. 4, No. 3.
Richard, T., "Challenges in Scaling Up Biofuels Infrastructure", Science, Aug. 13, 2010, 5 pages, vol. 329.
Rijal et al., "Combined Effect of Pelleting and Pretreatment on Enzymatic Hydrolysis of Switchgrass", Bioresource Technology, 2012, pp. 36-41, vol. 116.
Sarko et al., "Packing Analysis of Carbohydrates and Polysaccharides, 7. Crystal Structure of Cellulose III1 and its Relationship to Other Cellulose Polymorphs", Sep.-Oct. 1976, 8 pages, vol. 9, No. 5.
Sarks et al., "Scaling Up and Benchmarking of Ethanol Production from Pelletized Pilot Scale AFEX Treated Corn Stover Using Zymomonas mobilis 8b", Biofuels, 2016, pp. 253-262 vol. 7, No. 3.
Sheridan et al., "Assessment of the Influence of Media Particle Size on the Biofiltration of Odorous Exhaust Ventilation Air from a Piggery Facility", Bioresource Technology, 2002, pp. 129-143, vol. 84.
Notice of Granted Patent and Certificate of Grant received for corresponding Malaysian application PI2014002999, dated Apr. 23, 2020, 3 pages.
Examination Report received for Indian Patent Application No. 9093/DELNP/2012, dated Sep. 6, 2017, 8 pages.
Office Action received for Canadian Patent Application No. 2,650,860, dated Oct. 24, 2011, 3 pages.
Office Action received for Canadian Patent Application No. 2,650,860, dated Jun. 18, 2012, 2 pages.
Office Action received for Canadian Patent Application No. 2,737,704, dated Jun. 4, 2012, 4 pages.
Office Action received for Canadian Patent Application No. 2,737,704, dated Nov. 5, 2012, 3 pages.
Office Action received for Canadian Patent Application No. 2,737,704, dated Feb. 21, 2013, 3 pages.
Office Action received for Canadian Patent Application No. 2,760,840, dated Mar. 28, 2012, 3 pages.
Office Action received for Canadian Patent Application No. 2,760,840, dated Jan. 3, 2013, 3 pages.
Office Action received for Canadian Patent Application No. 2,762,985, dated Jul. 6, 2012, 2 pages.
Office Action received for Canadian Patent Application No. 2,797,193, dated Jan. 8, 2014, 3 pages.
Office Action received for Canadian Patent Application No. 2,797,193, dated Jun. 13, 2014, 3 pages.
Office Action received for Canadian Patent Application No. 2,797,193, dated Oct. 1, 2014, 2 pages.
Office Action received for European Patent Application No. 07776479.3, dated Dec. 5, 2012, 4 pages.
Office Action received for European Patent Application No. 07776479.3, dated May 30, 2012, 6 pages.
Notice of Allowance received for U.S. Appl. No. 11/729,632, dated Nov. 16, 2009, 7 pages.
Office Action received for European Patent Application No. 11772569.7, dated Jul. 5, 2016, 3 pages.
European Search Report received for Patent Application No. 11772569.7, dated Sep. 19, 2013, 10 pages.
Office Action received for European Patent Application No. 11772569.7, dated Jan. 23, 2015, 4 pages.
Office Action received for European Patent Application No. 11772569.7, dated Sep. 28, 2015, 5 pages.
Office Action received for European Patent Application No. 11772569.7, dated Jul. 29, 2015, 3 pages.
Office Action received for European Patent Application No. 11772569.7, dated Nov. 30, 2012, 2 pages.
Final Office Action received for U.S. Appl. No. 12/226,763, dated Jan. 10, 2012, 16 pages.

(56) References Cited

OTHER PUBLICATIONS

Notice of Allowance received for U.S. Appl. No. 12/226,763, dated Jan. 22, 2013, 7 pages.
Notice of Allowance received for U.S. Appl. No. 12/226,763, dated Oct. 1, 2012, 7 pages.
Final Office Action received for U.S. Appl. No. 12/229,225, dated Jan. 6, 2012, 7 pages.
Notice of Allowance received for U.S. Appl. No. 12/286,913, dated Oct. 3, 2012, 9 pages.
Non-Final Office Action received for U.S. Appl. No. 12/286,913, dated Mar. 1, 2012, 7 pages.
Advisory Action received for U.S. Appl. No. 12/763,102, dated Dec. 6, 2013, 3 pages.
Non-Final Office Action received for U.S. Appl. No. 12/763,102, dated Dec. 24, 2012, 18 pages.
Restriction Requirement received for U.S. Appl. No. 12/763,102, dated Sep. 17, 2012, 11 pages.
Notice of Allowance received for U.S. Appl. No. 12/976,344, dated Feb. 23, 2012, 7 pages.
Notice of Allowance received for U.S. Appl. No. 12/976,344, dated Mar. 27, 2012, 8 pages.
Notice of Allowance received for U.S. Appl. No. 13/202,011, dated Jan. 22, 2014, 5 pages.
Non-Final Office Action received for U.S. Appl. No. 13/202,011, dated Sep. 27, 2012, 8 pages.
Notice of Allowance received for U.S. Appl. No. 13/642,052, dated Jan. 5, 2017, 10 pages.
Non-Final Office Action received for U.S. Appl. No. 13/642,052, dated Jan. 7, 2015, 33 pages.
Final Office Action received for U.S. Appl. No. 13/642,052, dated Jun. 18, 2015, 32 pages.
Non-Final Office Action received for U.S. Appl. No. 13/642,052, dated Jul. 7, 2016, 30 pages.
Restriction Requirement received for U.S. Appl. No. 13/642,052, dated Mar. 12, 2014, 10 pages.
Final Office Action received for U.S. Appl. No. 13/886,021, dated Feb. 24, 2015, 31 pages.
Final Office Action received for U.S. Appl. No. 13/886,021, dated Jun. 14, 2016, 33 pages.
Final Office Action received for U.S. Appl. No. 13/886,021, dated Dec. 7, 2017, 24 pages.
Non-Final Office Action received for U.S. Appl. No. 13/886,021, dated Jun. 30, 2014, 37 pages.
Non-Final Office Action received for U.S. Appl. No. 13/886,021, dated Oct. 30, 2015, 22 pages.
Non-Final Office Action received for U.S. Appl. No. 13/886,021, dated Jun. 8, 2017, 23 pages.
Patent Examination Report received for Australian Patent Application No. 2010249409, dated Aug. 30, 2012, 4 pages.
Patent Examination Report received for Australian Patent Application No. 2010289797, dated Oct. 30, 2012, 4 pages.
Patent Examination Report received for Australian Patent Application No. 2011201768, dated Jun. 21, 2012, 3 pages.
Patent Examination Report received for Australian Patent Application No. 2011242896, dated Oct. 30, 2013, 4 pages.
Desikan et al. "Hydrodynamic Cavitation—A Promising Technology for Biomass Pretreatment", International Journal of Environmental Sciences and Natural Resources, May 23, 2019, pp. 84-88, vol. 19, No. 3.
Merino et al. "Progress and Challenges in Enzyme Development for Biomass Utilization", Advances in Biochemical Engineering/ Biotechnology, Jun. 27, 2007, vol. 108, pp. 95-120.
Acetamide, IPCS INCHEM, 3 pages, https://www.yumpu.com/en/ document/view/13829650/acetamide-acetic-acid-amide-ethanamide-methane-usp, Dec. 31, 2013.

\* cited by examiner

DE-ESTERIFICATION OF BIOMASS PRIOR TO AMMONIA PRETREATMENT

This application claims from U.S. Provisional Application No. 62/529,982, filed on Jul. 7, 2017, which is hereby incorporated by reference herein in its entirety.

BACKGROUND

Useful cellulosic- or lignocellulosic-based products can be produced using various types of ammonia pretreatment methods.

SUMMARY

In one embodiment, a method of de-esterifying biomass is provided, comprising performing an alkali de-esterification step with an alkali to cleave ester linkages present in the biomass prior to an ammonia pretreatment process to produce ammonia pretreated biomass containing limited to substantially no amides. The biomass can be lignocellulosic or cellulosic biomass. The ammonia pretreatment process can be any type of liquid or gaseous pretreatment process, including, but not limited to, an ammonia fiber expansion (AFEX) process (e.g., liquid, gaseous, extractive), a liquid ammonium hydroxide process, an anhydrous liquid ammonia process (ALAP), an extractive ammonia process (with loose lignocellulosic biomass) or a densified cellulosic conversion liquid ammonia pretreatment (i.e., "COBRA") process (with densified lignocellulosic biomass). In various embodiments, a densification step is performed before, during and/or after the ammonia pretreatment process.

The advantages of a de-esterification step prior to an ammonia pretreatment step include, but are not limited to, utilizing less ammonia and producing a pretreated product with limited to substantially zero to no amide formation. In various embodiments, the pretreated product is further processed for use as animal feed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1A:
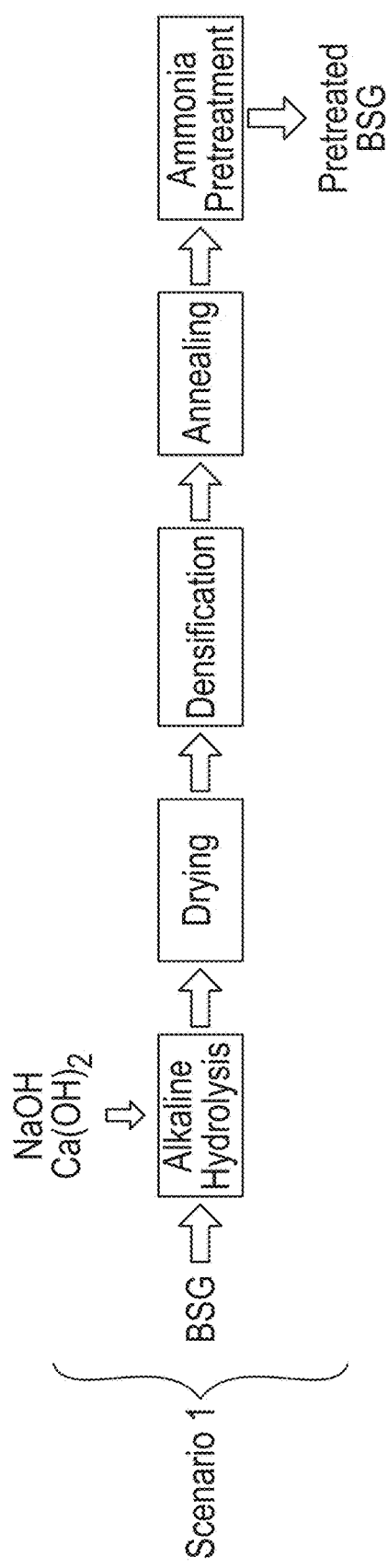
FIGS. 1A and 1B are schematic illustrations showing two different scenarios for producing pretreated Brewer's Still Grains (BSG) using an alkaline hydrolysis step, i.e., a de-esterification step, as a first step, including A) Scenario "1" which utilizes BSG as a starting material for de-esterification with sodium hydroxide (NaOH) and/or calcium hydroxide ($Ca(OH)_2$), followed by a drying step, a densification step, and an annealing (drying) step prior to an ammonia pretreatment and B) Scenario "2," which utilizes BSG as a starting material, followed by a pressing (i.e., compaction) step, with the resulting solids subject to a densification step followed by an annealing step prior to ammonia pretreatment, and the resulting liquid extracted, each according to various embodiments.

In the following detailed description, embodiments are described in sufficient detail to enable those skilled in the art to practice them, and it is to be understood that other embodiments may be utilized, and that chemical and procedural changes may be made without departing from the spirit and scope of the present subject matter. The following detailed description is, therefore, not to be taken in a limiting sense, and the scope of embodiments is defined only by the appended claims.

The term "biomass" as used herein, refers in general to organic matter harvested or collected from a renewable biological resource as a source of energy. The renewable biological resource can include plant materials, bacterial materials, algal materials and/or materials produced biologically, as well as cellulosic materials processed in the pulp and paper industry, cotton fibers and bacterial cellulose, as well as pure cellulose. The term "biomass" is not considered to include fossil fuels, which are not renewable.

The term "plant biomass" or "ligno-cellulosic biomass (LCB)" as used herein is intended to refer to virtually any plant-derived organic matter containing cellulose and/or hemicellulose as its primary carbohydrates (woody or non-woody) available for producing energy on a renewable basis. Plant biomass can include, but is not limited to, agricultural residues such as corn stover, wheat straw, rice straw, sugar cane bagasse and the like. Plant biomass further includes, but is not limited to, woody energy crops, wood wastes and residues such as trees, including fruit trees, such as fruit-bearing trees, (e.g., apple trees, orange trees, and the like), softwood forest thinnings, barky wastes, sawdust, paper and pulp industry waste streams, wood fiber, and the like. Additionally, perennial grass crops, such as various prairie grasses, including prairie cord grass, switchgrass, *Miscanthus*, big bluestem, little bluestem, side oats grama, and the like, have potential to be produced large-scale as additional plant biomass sources. For urban areas, potential plant biomass feedstock includes yard waste (e.g., grass clippings, leaves, tree clippings, brush, etc.) and vegetable processing waste. Plant biomass is known to be the most prevalent form of carbohydrate available in nature and corn stover is currently the largest source of readily available plant biomass in the United States. When describing the various embodiments and used without a qualifier, the term "biomass" is intended to refer to "plant biomass," i.e., lignocellulosic biomass (LCB).

The term "fiber" as used herein is intended to refer to one piece of biomass whose particle size has been reduced from its original size by any means, including, naturally, i.e., such as by exposure to the elements, by hand and/or by using various machines, such as milling and/or shredding machines.

The term "biochemical" as used herein refers to chemical molecules produced using biological resources. Examples include, but are not limited to, lactic acid, acetic acid, propionic acid, butanol, isobutanol, acetone, and the like. A more complete discussion of biochemical products can be found herein.

The term "biofuel" as used herein, refers to any renewable solid, liquid or gaseous fuel produced biologically and/or chemically, for example, those derived from biomass. Most biofuels are originally derived from biological processes such as the photosynthesis process and can therefore be considered a solar or chemical energy source. Other biofuels, such as natural polymers (e.g., chitin or certain sources of microbial cellulose), are not synthesized during photosynthesis, but can nonetheless be considered a biofuel because they are biodegradable.

There are generally considered to be three types of biofuels derived from biomass synthesized during photosynthesis, namely, agricultural biofuels (defined below), municipal solid waste biofuels (residential and light commercial garbage or refuse, with most of the recyclable materials such as glass and metal removed) and forestry biofuels (e.g., trees, waste or byproduct streams from wood products, wood fiber, pulp and paper industries). Biofuels produced from biomass not synthesized during photosynthesis include, but are not limited to, those derived from chitin, which is a chemically modified form of cellulose known as an N-acetyl glucosamine polymer. Chitin is a significant component of the waste produced by the aquaculture industry because it comprises the shells of seafood.

The term "agricultural biofuel", as used herein, refers to a biofuel derived from agricultural crops, lignocellulosic crop residues, grain processing facility wastes or other industrial waste (e.g., wheat/oat hulls, corn/bean fines, out-of-specification materials, brewer's spent grains, wheat middling, sugar beet fiber, soybean meal, and other cereal or seed covers, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinse/cleansing streams, etc.), value-added agricultural facility byproducts (e.g., distiller's wet grain (DWG), distiller's dry grain with soluble (DDGS), and syrup from ethanol production facilities, etc.), and the like. Examples of livestock industries include, but are not limited to, beef, pork, turkey, chicken, egg and dairy facilities. Examples of agricultural crops include, but are not limited to, any type of non-woody plant (e.g., cotton), grains such as corn, wheat, soybeans, sorghum, barley, oats, rye, and the like, herbs (e.g., peanuts), short rotation herbaceous crops such as switchgrass, alfalfa, and so forth.

The term "pretreatment step" as used herein, refers to any step intended to alter native or densified biomass (as defined herein) so it can be more efficiently and economically converted to reactive intermediate chemical compounds such as sugars, organic acids, etc., which can then be further processed to a variety of end products such as ethanol, isobutanol, long chain alkanes organic acids, etc. Pretreatment can reduce the degree of crystallinity of a polymeric substrate, reduce the interference of lignin with biomass conversion by hydrolyzing some of the structural carbohydrates, thus increasing their enzymatic digestibility and accelerating the degradation of biomass to useful products. Pretreatment methods can utilize acids of varying concentrations, including dilute acid pretreatments, concentrated acid pretreatments (using, for example, sulfuric acids, hydrochloric acids, organic acids, and the like) and/or alkali such as ammonia and/or ammonium hydroxide and/or calcium hydroxide and/or sodium hydroxide and/or lime, and the like. Pretreatment methods can additionally or alternatively utilize hydrothermal treatments including water, heat, steam or pressurized steam pretreatments, including, but not limited to, hydro-thermolysis pretreatment and liquid hot water pretreatment, further including, for example, acid catalyzed steam explosion pretreatment. Pretreatment can occur or be deployed in various types of containers, reactors, pipes, flow through cells and the like. Most pretreatment methods will cause the partial or full solubilization and/or destabilization of lignin and/or hydrolysis of hemicellulose to pentose sugars. Further examples of pretreatment include, but are not limited wet oxidation, organosols pretreatment and mechanical extrusion.

The term "mechanical process" as used herein refers to any non-chemical process that causes a physical change in structure and/or function of native biomass. Such a change includes, but is not limited to, particle size reduction of native biomass to produce fibers, which can be accomplished using various types of machines (e.g., bale busters, hammer mill, Wiley mill, and the like) or by grinding (e.g., cylindrical grinding, internal grinding, centerless grinding, surface grinding, and combinations thereof). Additionally, multiple different implements may be employed to perform the grinding. For example, ball mills, rod mills, autogenous mills, semi-autogenous grinding mills, pebble mills, high pressure grinding rolls, brush stone mills, vertical shaft impactor mills (VSI mill), tower mills, and combinations thereof, may be used. Densification is one example of a mechanical process.

The term "Ammonia Fiber Expansion" (hereinafter "AFEX") pretreatment" as used herein, refers to a process for pretreating lignocellulosic biomass with liquid and/or vapor (gaseous) ammonia to solubilize lignin from plant cell walls and redeposit it from in between plant cell walls to the surface of the biomass. An AFEX pretreatment disrupts the lignocellulosic matrix, thus modifying the structure of lignin, partially hydrolyzing hemicellulose, and increasing the accessibility of cellulose and the remaining hemicellulose to subsequent enzymatic degradation.

However, in contrast to many other pretreatments, the lower temperatures and non-acidic conditions of the AFEX process prevents lignin and/or sugars from being converted into furfural, hydroxymethyl furfural (HMF), and organic acids that could negatively affect microbial activity. The AFEX process further expands and swells cellulose fibers and further breaks up amorphous hemi-cellulose in lignocellulosic biomass (LCB). These structural changes open up the plant cell wall structure enabling more efficient and complete conversion of LCB to value-added products, while preserving the nutrient value and composition of the material. In one embodiment, Extractive Ammonia (EA) treatment serves as a pretreatment.

The term "gaseous AFEX pretreatment" as used herein, refers to an AFEX pretreatment as defined herein, which uses gaseous ammonia rather than liquid ammonia. By allowing hot ammonia gas, i.e., ammonia vapors (with or without a carrier) to condense directly on cooler biomass, the biomass heats up quickly when the ammonia and biomass come into intimate contact.

The term "extractives" as used herein refers to components in a cellulosic or lignocellulosic material that are removable with a solvent. Such extractives include, but are not limited to, biomass degraded products, plant metabolites, ash, proteins and sugar polymers, further including lignin (present in lignocellulosic biomass).

The term "conventional extractive ammonia" or "EA" or "EA/cellulosic conversion" as used herein, refers to a pretreatment that not only removes extractives during a low moisture liquid ammonia biomass treatment, but also converts at least a majority of cellulose I to cellulose III. In an EA treatment, the moisture content, residence time, temperature and ammonia to biomass ratio are configured to allow for conversion of a majority (i.e., at least 50%) to substantially all (at least 99%) to all (about 100% up to 100%) of the cellulose I present in the biomass being treated to cellulose III. Those skilled in the art understand that deviation from a proper combination of conditions (moisture content, temperature, residence time and ammonia to biomass ratio) will prevent a majority, or, in some cases, any of the cellulose I from being converted to cellulose III. For example, regardless of any other conditions, if the moisture content of the mixture (moisture inherent in the biomass and any moisture added to the biomass in any form) is too high, i.e., over 40%, no conversion takes place. Such a process would, therefore, fall outside the definition of an EA pretreatment. Examples of such non-extractive ammonia pretreatments include AFEX pretreatment methods. See, for example, Sousa L., et al., *Next-Generation Ammonia Pretreatment Enhances Biofuel Production*, Energy Environ. Sci., DOI: 10.1039/c5ee03051j (Feb. 23, 2016), 9 pages (hereinafter "Sousa Article"), which states that, "Other ammonia-based pretreatments such as ammonia fiber expansion (AFEX) (trade mark of MBI International, Lansing, Mich.) and ammonia-recycle percolation (ARP) do not lead to CIII formation because they employ high moisture contents and/or low ammonia-to-biomass ratios." In this testing, "AFEX-CS (AFEX-Corn Stover) was used as a control, as AFEX does not physically remove lignin and does not generate CHI." (See Sousa Article at Page 2, Col. 1). It is to be understood that the removal of extractives during pretreatment can be accomplished with or without solvents, depending on the ammonia to biomass loading.

The terms "densified cellulosic conversion liquid ammonia pretreatment" or "densified cellulosic conversion pretreatment" as used herein refers to a pretreatment of densified biomass particulates which produces pretreated/cellulose III-containing densified biomass. This process is currently being referred to by those skilled in the art as "COBRA" although it is to be understood that the biomass is "densified" not "compacted" as defined herein and further that no ramping of the temperature is required in such a process. As with the EA pretreatment defined above, in a densified cellulosic conversion pretreatment, the moisture content, residence time, temperature and ammonia to biomass ratio are configured to allow for conversion of a majority (i.e., at least 50%) to substantially all (at least 99%) to all of the cellulose I present in the densified biomass being treated to cellulose III. Those skilled in the art understand that deviation from a proper combination of conditions (moisture content, temperature, residence time and ammonia to biomass ratio) will prevent a majority, or, in some cases, any of the cellulose I from being converted to cellulose III. For example, regardless of any other conditions, if the moisture content of the mixture (moisture inherent in the biomass and any moisture added to the biomass in any form) is too high, i.e., over 40%, no conversion takes place. Such a process would, therefore, fall outside the definition of a densified cellulosic conversion pretreatment (For additional examples, see definition of EA above).

The terms "extractive densified cellulosic conversion liquid ammonia pretreatment" or "extractive densified cellulosic conversion pretreatment" as used herein, refer to a densified cellulosic conversion pretreatment which also removes at least some extractives. It is to be understood that the removal of extractives during pretreatment can be accomplished with or without solvents, depending on the ammonia to biomass loading.

The term "pretreated/cellulose III-containing densified biomass" as used herein refers to densified biomass which has been pretreated in a process that converted at least a majority of its cellulose I to cellulose III.

The term "loose biomass" as used herein refers to cellulosic or lignocellulosic biomass that has not been subject to sufficient compression or extrusion to be formed into a single densified biomass particulate, i.e., densified biomass. Biomass that has been formed into bales (e.g., round, cubic, etc.) and then unbaled for use in a facility is still considered to be "loose biomass" and is therefore encompassed within this definition. Biomass that has been subject to chopping or other particle size reducing mechanical processes are also considered to be loose biomass.

The terms "compacted biomass" or "compressed bales" or "compacted bales" as used herein refer to loose biomass or bales which have been compressed, i.e., compacted, to reduce empty space between the loose biomass fibers. Loose biomass fibers are highly elastic and require an external force to be applied continuously to maintain a state of compaction. For example, baled biomass requires compaction forces to be constantly applied externally by twine or plastic strips to maintain the shape of the bale. In this way, loose biomass fibers, such as loose biomass fibers collected from various plant sources, are not chemically or physically adhered/bound to each other in the same way densified biomass. As such, a considerable amount of space still exists between the various plant fibers in baled biomass. In addition, given the elastic nature of loose biomass fibers, the compacted bales inherently start reverting back to their original configuration once the compression is released, such as when the twine or plastic strips are cut, wherein the space between fibers again increases.

The term "particulate" or "biomass particulate" or "densified biomass particulate" or "densified biomass" as used herein refers to densified (i.e., solid) biomass formed from a plurality of loose biomass fibers which are subject to a mechanical densification process which either compresses or extrudes the biomass to form a single particulate product (or products) which is dividable into separate pieces. Since the densified fibers in the particulate are no longer elastic, the particulate retains its shape, i.e., does not begin to expand once compression is released, i.e., after the densification process is stopped. A particulate can be hydrolysable or non-hydrolysable and can range in size from small, dense microscopic particles (larger than powders) to pellets or large objects, such as bricks, or larger, such as densified bales or larger, with any suitable mass. The specific geometry and mass will depend on a variety of factors including the type of biomass used, the amount of compression used to create the particulate, the desired length of the particulate, and the particular end use. As such, when the term "densified biomass" is used it is intended to refer to one or more "densified biomass particulates." As used herein, a densified biomass particulate is intended to include particulates made with and without added binders. Particulates made without binders are generally made from lignocellulosic biomass, with the natural constituents of the biomass, such as lignin and proteins, conferring natural binding capacity when subjected to certain temperatures and moisture content.

The term "briquette" as used herein refers to a densified biomass particulate which is a compressed particulate of various shapes (e.g., hexagon, cylindrical, cuboid, etc.) which retains its shape even after the compression is released. Briquettes are made in briquette machines under modest pressure, are typically about to 2 to about 3 orders of magnitude larger than pellets, and typically more brittle than pellets. A briquette retains its shape after exiting the briquette machine.

The term "pellet" as used herein refers to a densified biomass particulate which is an extruded particulate, i.e., a compressed particulate formed by a shaping process in which biomass is forced through a die (e.g., a cylindrical die) or a rotating press at pressures about 3.5 times greater than those used to make briquettes. As such, a given amount of pellets has a greater bulk density than a given amount of briquettes. A pellet retains its shape even after the extrusion is complete.

The term "bulk density" as used herein, refers to the mass or dry weight of a quantity of fibers or particulates divided by the total volume they occupy (mass/volume). Therefore, bulk density is not an intrinsic property of the fibers or particulates, as it is changeable when the fibers or particulates are subjected to movement from an external source. The volume measurement is a combination of the fiber or particulate volume (which includes the internal pore volume of a fiber or particulate) and the intra-particle void volume. Bulk density=intrinsic density (of each fiber or particulate)× (1−voids fraction). For a given intrinsic fiber or particulate density, therefore, the bulk density depends only on the void fraction, which is variable.

The term "moisture content" as used herein, refers to percent moisture present in biomass. Moisture content can be expressed on a dry weight basis (dwb) or a total weight basis, i.e., moisture wet basis (mwb). The total moisture content is calculated as grams of liquid, such as water per gram of biomass (biomass dry matter plus water) liquid times 100%. However, when used without qualification herein, the % moisture content refers to a dry weight basis.

The term "flowability" as used herein refers to the ability of particulates to flow out of a container using only the force of gravity. A product having increased flowability, therefore, would flow out of the container at a faster rate as compared to a product having lower flowability.

The term "logistical properties" as used herein refers to one or more properties of a particulate related to storage, handling, and transportation, which can include, but are not limited to stability, shelf life, flowability, high bulk density, high true density, compressibility, durability, relaxation, spring back, permeability, unconfined yield strength, and the like.

Conventional ammonia pretreatment methods used to convert biomass to sugars react with acetyl and other ester linkages also present in the plant cell wall (e.g., arabinoxylan ester linkages) to cleave these linkages, thus allowing enzymes such as arabinase, xylanse, xylosidase, to break down the hemicellulose to monomeric sugars such as arabinose, xylose and galactose. However, these reactions produce corresponding amides (e.g., acetamide, coumaroylamide, feruloylamide, and the like) which are known to be neurotoxic above certain concentrations. The presence of these compounds can require further processing prior to use, such as for animal feed. See, for example, pesticideinfo.org/Detail_Chemical.jsp?Rec_Id=PC36311; inchem.org/documents/icsc/icsc/eics0233.htm;onboces.org/safety/msds/S/Scholar%20Chemical/Acetamide 1.00.pdf; and epa.gov/sites/production/files/2016-09/documents/acetamide.pd-f.

As such, use of an alkali de-esterification step, i.e., a "pre" ammonia pretreatment step, i.e., a "de-esterification" step, represents an improvement in this regard. Those skilled in the art may also consider the de-esterification step a hydrolysis process since the ester linkages are technically being hydrolyzed. By limiting the number of or eliminating ester linkages prior to formation of amides, additional process steps following ammonia pretreatment to remove amides can be avoided in various embodiments. Such steps include wetting the pretreated biomass, treating the wetted pretreated biomass with the desired alkali, and then drying the alkali-treated, wetted biomass. Additionally, by removing or limiting the number of acetyl groups present in the biomass, the "sink" for ammonia (i.e., ester linkages) is either significantly eliminated or no longer present. As such, the novel process described herein, has the additional benefit of reducing the amount of ammonia consumed during the ammonia pretreatment process (e.g., COBRA), such as by up to 5% or 4% or 3% or 2% or 1%, as compared to a conventional ammonia pretreatment process which does not utilize a prior de-esterification step. Reduction in the amount of ammonia utilized also reduces costs, as ammonia is known to be three to four times more expensive than various types of alkali.

In various embodiments described herein, an alkali de-esterification step is provided prior to an ammonia pretreatment step. In one embodiment, the alkali de-esterification step is performed according to the processes described in Improved Xylan Hydrolysis of Corn Stover by Deacetylation with High Solids Dilute Acid Pretreatment, *Ind. Eng. Chem. Res.*, 2012, 51 (1), pp 70-76, pubs.acs.org/doi/pdf/10.1021/ie201493g or A highly efficient dilute alkali deacetylation and mechanical (disc) refining process for the conversion of renewable biomass to lower cost sugars, *Biotechnology for Biofuels* 7:98 (2014), biotechnologyforbiofuels.biomedcentral.com/articles/10.1186/1754-6834-7-98, each of which is hereby incorporated by reference herein in its entirety.

In one embodiment, the alkali de-esterification step, i.e., a "pre-ammonia pretreatment or "alkaline hydrolysis" step comprises treating biomass (cellulosic or lignocellulosic) to a mild alkali treatment (e.g., 120° C. or less at a concentration of 2% to 8% of alkali in water (e.g., 20 to 80 g of alkali in 1 L of water) at a calculated biomass to alkali loading using suitable residence times and pressures, to cleave ester linkages present in the biomass, thus preventing or significantly limiting the formation of amides. In most embodiments, all of the ester linkages are cleaved, and amide formation is completely eliminated. In one embodiment, at least a majority of the ester linkages are cleaved, thus limiting amide formation. In other embodiments, a strong alkali treatment is used in which the alkali has a concentration greater than 8%.

In one embodiment, an alkali de-esterification step is performed using an alkali such as lime ($Ca(OH)_2$) or NaOH in a mild alkali treatment performed at a temperature of no greater than 120° C., down to room temperature, such as no greater than 110° C., no greater than 100° C., no greater than 90° C., no greater than 80° C., no greater than 70° C., or no greater than 65° C., including, but not limited to ranges from about 100 to about 120° C. or lower, such as from about 65 to about 120° C., such as from about 70 to about 120° C., such as from about 80 to about 120° C., such as from about 90 to about 120° C., such as from about 90 to about 110° C., including any range there between.

In one embodiment, the de-esterification step is performed using a concentration of no more than 8% alkali. In various embodiments, the ratio is from about 2 to about 8%, such as from about 3 to about 7%, from about 4 to about 6%, from about 3 to about 6%, or from about 3 to about 5%, including any ranges there between, further including no more than 7% concentration alkali, no more than 5%, no more than 4%, s no more than 3%, such more than 2%, or no more than 1%. In one embodiment, use of an alkali de-esterification step with an alkali concentration of no more than 4% completely prevents amide formation (e.g., acetamide) in the final product, such that the concentration of amides in the final product is substantially zero (≤0.01 mg/g of biomass) or zero.

In one embodiment, sodium hydroxide (NaOH), calcium hydroxide ($Ca(OH)_2$), or potassium hydroxide (KOH), or a combination thereof, is used as the alkali.

The biomass being treated can comprise any type of biomass as defined herein. In various embodiments, the biomass being treated includes, but is not limited to, brewer's spent grains (BSG), DDGS, corn stover, poplar, switchgrass, sugarcane bagasse, wheat straw, sorghum, energy cane, *miscanthus*, soybean meal, and combinations thereof.

Of note, while the resulting levels of amides in the de-esterified/ammonia pretreated biomass can be comparable to or slightly higher than the levels found in untreated DGGS and untreated BSG, the digestibility in these untreated cellulosic products is inherently low, such as less than 60%. The use of a de-esterification step in combination with an ammonia pretreatment step results in a product that is not only low in or without amides, but which also has a much higher digestibility than untreated DGGS or untreated BSG, such as greater than 90% or greater than 95%, such as from about 90% to about 96% or from about 90% to about 94%.

In various embodiments, amide formation (e.g., acetamide) formation is limited to levels less than 0.04 mg/g of biomass, or less than 0.03 mg/g, or less than 0.02 mg/g, down to substantially zero % (i.e., ≤0.01 mg/g) or zero.

The de-esterification step can be carried out for any suitable time period. In one embodiment, the process is carried out for no more than 4 hours. In one embodiment, the process is carried out for a time period from about 30 min to about 4 hours, about 1 hr to about 4 hrs, about 1 hr to about 3 hrs, about 1 hr to about 2 hrs, about 2 hrs, to about 3 hrs, about 10 to about 30 min, about 30 to about 40 min, including any range there between.

Any suitable solids (biomass) loading to alkali solution can be used. In one embodiment, the solids loading ranges from about 40% down to about 4%, such as from 40 to about 10%, such as from about 35% to about 10%, such as from about 30% to about 15%, such as from about 30% to about 20%, such as from about 30% to about 25%, such as from about 20 to about 10% or from about 18 to about 14% or from about 17 to about 12% or from about 16 to about 12%, including any range there between. In various embodiments, the solids loading is no more than 40% or 35% or 30% or 25% or 20% or 15% or 10% or 5% or 4%.

In one embodiment, the solids loading ranges from about 15 to 25% in a solution containing 8% alkali (e.g., lime) (e.g., 200 g of biomass added to 80 g of lime in 1 L of water), which is equivalent to a 40% biomass to alkali ratio. In various embodiments, the biomass to alkali ratio is no greater than 40%, such as no greater than 35%, no greater than 30%, no greater than 25%, no greater than 20%, no greater than 15%, no greater than 10%, no greater than 5%, or no greater than 4%, including any range or value there between. In one embodiment the solids loading ranges from about 15 to about 25%, such as from about 18 to about 22% in an alkali solution of 2 to 4%. See also Example 1 which includes testing with a solids loading of 20% in a 4% alkali concentration.

In various embodiments, an alkali de-esterification step is performed as part of a drying process for biomass, such as with Brewer's Spent Grains (BSG), which are wet when exiting a brewery. In one embodiment, cellulosic biomass, such as BSG, is annealed (i.e., dried) to reduce % moisture levels (mwb) from high levels (e.g., 150%) to no more than 30%, such as no more than 25%, such as no more than 20%, such as no more than 15%, such as no more than 10% or lower. In other embodiments, the moisture level is reduced to a range from about 12 to about 18% with the drying step. In other embodiments, the de-esterified biomass can be dried to a moisture level from about 20% to about 60% and subject to any suitable type of ammonia pretreatment.

In various embodiments, a densification step is performed before, during and/or after the ammonia pretreatment process. In various embodiments, the densification is performed according to the methods described in U.S. Pat. No. 8,673,031, entitled, "Process for the Treatment of Lignocellulosic Biomass" or U.S. patent application Ser. No. 13/835,382 entitled, "Densified Biomass Product Containing Pretreated Biomass Fibers," each owned by the same Assignee and hereby incorporated by reference herein in its entirety.

In one embodiment, dried (i.e., annealed) biomass (e.g., dried BSG or DDGS) is densified prior to the de-esterification step. In one embodiment, dried biomass is densified following the de-esterification step. In one embodiment, the densified biomass is dried to reduce moisture content (mwb) to no more than 10%.

In one embodiment, loose lignocellulosic biomass is subject to de-esterification, and the subsequent ammonia pretreatment process is a liquid ammonia pretreatment process configured to convert cellulose I to cellulose III according to the methods described in U.S. Pat. No. 9,650,657, entitled, "Methods for Producing Extracted and Digested Products from Pretreated Lignocellulosic Biomass," owned by the same Assignee and hereby incorporated by reference herein in its entirety.

In one embodiment, densified lignocellulosic biomass is subject to de-esterification, and the subsequent ammonia pretreatment process is a densified cellulosic conversion liquid ammonia process, referred to herein as "COBRA," which also converts Cellulose I to Cellulose III, and is described in U.S. patent application Ser. No. 15/916,223 entitled, "Pretreatment of Densified Biomass using Liquid Ammonia and Systems and Products Related Thereto," (hereinafter the "'223 Application") owned by the same Assignee and hereby incorporated by reference herein in its entirety.

In one embodiment, densified or loose biomass is subject to de-esterification, and the subsequent ammonia pretreatment process is an AFEX pretreatment process, such as extractive AFEX, a liquid AFEX, or gaseous AFEX. The AFEX processes include, but are not limited to, the processes described in U.S. Pat. Nos. 8,394,611; 8,771,425; 8,968,515 and 9,644,222, each of which are hereby incorporated by reference herein in its entirety. See also, for example, U.S. Pat. No. 6,106,888 ('888), U.S. Pat. No. 6,176,176 ('176), U.S. Pat. No. 5,037,663 ('663), and U.S. Pat. No. 4,600,590 ('590), each of which are hereby incorporated by reference herein in its entirety.

In various embodiments, the ammonia pretreatment is a liquid ammonia hydroxide process or an anhydrous liquid ammonia process (ALAP).

Figure 1B:
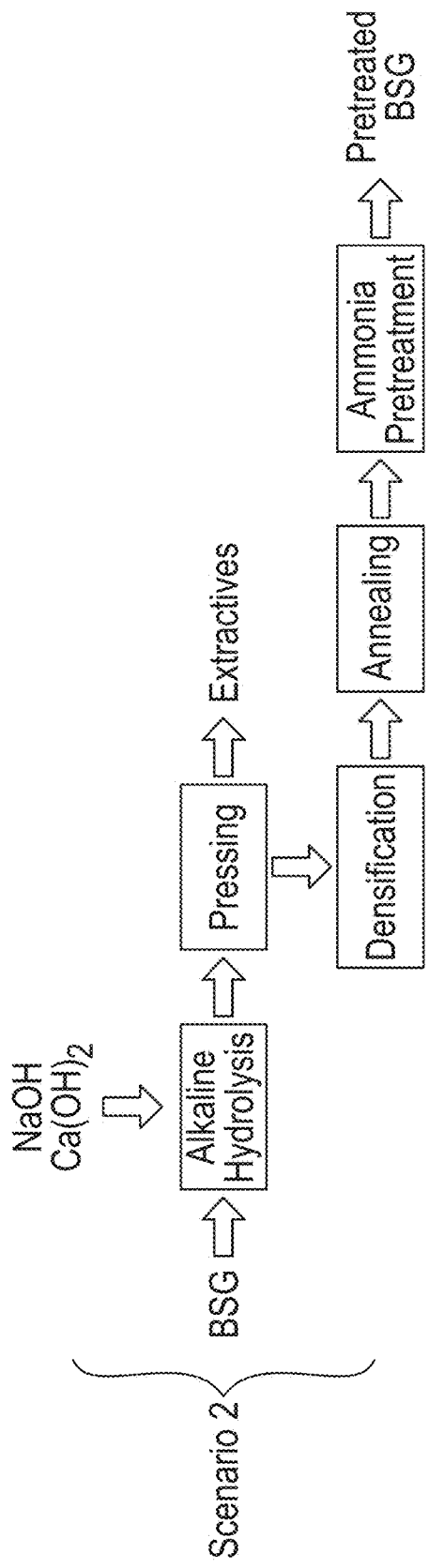
Figure 2:
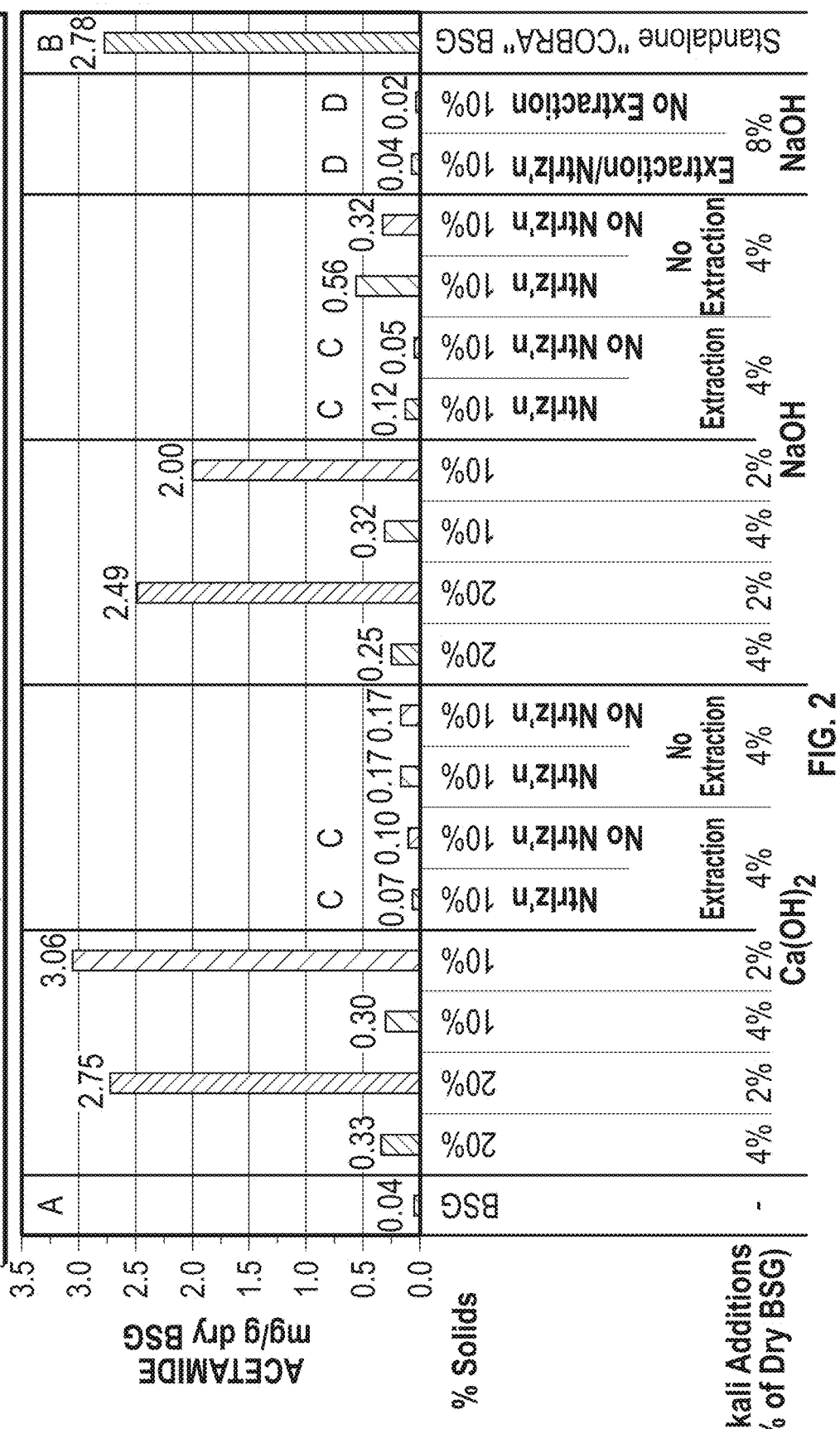
FIG. 2 shows acetamide levels (mg/g biomass) after different testing conditions according to various embodiments.

FIGS. 1A and 1B are schematic illustrations showing Scenarios "1" and "2," respectively, for producing pretreated BSG. Example 1 provides results (See FIG. 2) for testing using these conditions at specific loadings, concentrations, temperatures and residence times. It is to be understood that other variations are possible, including, but not limited to using Scenario "1" with a solids loading from about 35 to about 45%, including at least or no more than 40% at various alkali concentrations, including, but not limited to at least or no more than 4% or at least or no more than 8%, and using Scenario "2" with a solids loading from about 55 to about 65%, including at least or no more than 60% at various alkali concentrations, including, but not limited to at least or no more than 4% or at least or no more than 8%.

Figure 3A:
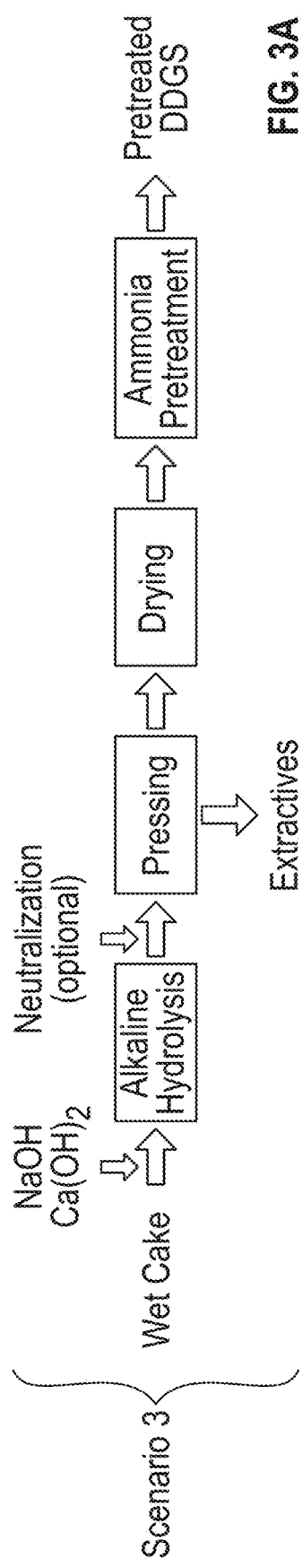
FIGS. 3A-3C are schematic illustrations showing three different scenarios for producing pretreated Distiller's Dry Grains (DDGS) using an alkaline hydrolysis step, i.e., a de-esterification step as a first step, including A) Scenario "3" which utilizes wet cake as a starting material for de-esterification with NaOH and/or $Ca(OH)_2$, followed by an optional neutralization step, an extraction step and a drying step prior to ammonia pretreatment, B) Scenario "4" which utilizes DDGS as a starting material with NaOH and/or $Ca(OH)_2$, followed by an optional neutralization step, an extraction step and a drying step prior to ammonia pretreatment, and C) "Scenario "5," which utilizes wet cake as a starting material with NaOH and/or $Ca(OH)_2$, followed by an optional neutralization step and a drying step prior to ammonia pretreatment, all according to various embodiments.
Figure 3B:
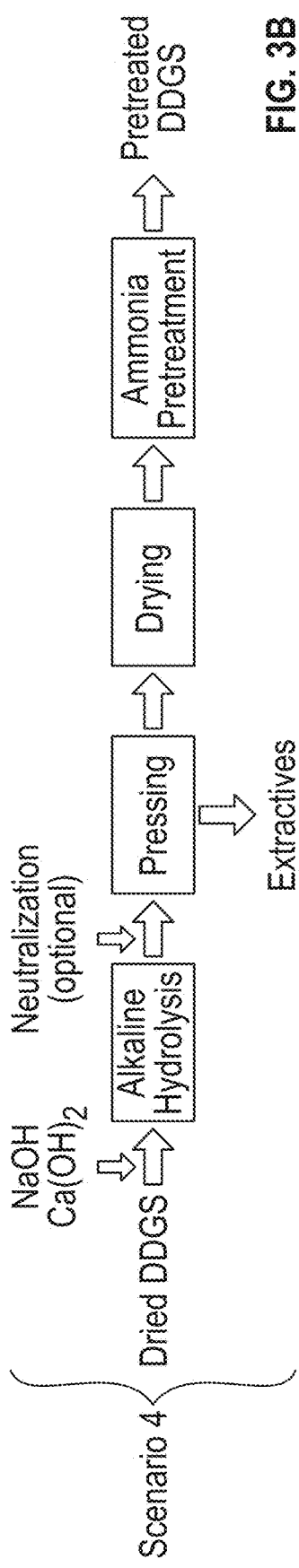
Figure 3C:
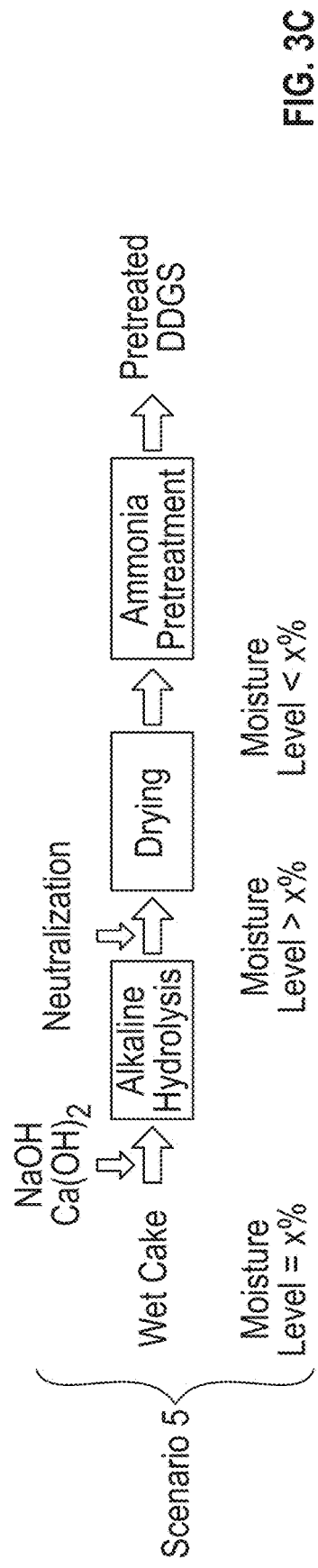

FIGS. 3A-3C are schematic illustrations showing Scenarios "3," "4" and "5" for producing pretreated DDGS using an alkaline hydrolysis step, i.e., a de-esterification step as a first step. Example 2 provides results for testing using these conditions. It is to be understood that other scenarios are also possible, including, any of the variations described herein. Scenario "5," in particular can produce pretreated DDGS having a high protein content of at least 10% at a cost lower than conventional methods.

The various embodiments will be further described by reference to the following examples, which are offered to further illustrate various embodiments. It should be understood, however, that many variations and modifications may be made while remaining within the scope of the various embodiments.

Example 1

Materials and Methods

Brewers Spent Grain (BSG) from a local brewery was dried to a total moisture content (mwb) of approximately 15% and milled to 40 mesh particle size using a Wiley mill. The milled biomass was stored at 4° C. before being used in densification experiments. These materials were densified into pellets using a Buskirk Engineering PM800 pellet mill.

Testing was performed according to Scenarios "1" and "2" as shown in FIGS. 1A and 1B, respectively. Moisture content was measured by an A&D moisture analyzer and raised to approximately 30% by adding deionized water before adding the milled biomass to the pelletizer. The sized reduced biomass was then fed to the pellet mill. Temperatures within the mill rose rapidly to as high as 150° C. due to heat dissipation generated by friction between the biomass, the rollers and the pellet dye. The densified biomass exiting the mill had a total moisture content (mwb) of about 15 to 20%. Thereafter, the densified biomass was annealed in an electrical oven set to 50° C. overnight to reduce the total moisture content to less than 8% (mwb).

These samples were subjected to varying levels of alkali conditions using two different alkali, namely, $Ca(OH)_2$ and NaOH (Sigma Aldrich, 99.9% purify). Alkali concentrations tested included 2% and 4%. Two different solids loading (10% and 20%) were evaluated during alkali treatment. For 10% solids loading, samples were evaluated as is or after separation/removal of free liquid.

Residence times for de-esterification varied from about 30 minutes to 60 minutes. Temperatures for the de-esterification step varied from about 50 to about 100° C.

Excess alkali was neutralized in some samples by concentrated hydrochloric acid or concentrated sulfuric acid (Sigma Aldrich) prior to the subsequent ammonia pretreatment. Other samples were not.

Thereafter, both neutralized and un-neutralized de-esterified samples were subject to a "COBRA" pretreatment, as defined herein, and performed as described in Example 1 of the '223 Application. Specifically, approximately 44.4 g of each material was pretreated with liquid anhydrous ammonia (source, 99.99%) in an 800 ML cylindrical reactor custom designed at Michigan State University (See Sousa L., et al., *Next-Generation Ammonia Pretreatment Enhances Biofuel Production*, Energy Environ. Sci., DOI: 10.1039/c5ee03051j (Feb. 23, 2016), 9 pages, which is incorporated by reference herein in its entirety).

In each instance, the reaction was allowed to proceed at ambient temperatures (25° C.) for 30 minutes, ramped to 70° C., and allowed to react for another 6 hours, after which the pressure was released. Biomass to ammonia loadings were varied from 0:1 to 1:1 in increments of 0.25, with testing for each loading carried out in triplicate. The pretreated materials were allowed to dry in a fume hood for approximately 24 hr. A mortar and pestle were used on the pretreated materials to ensure homogeneity for later testing. Table 2 shows the pretreatment conditions used. The materials were then extracted at 100° C. and 1500 psi in a DIONEX ASE 200 Accelerated Solvent Extractor with 95% ethanol.

These treatments were successful in deacetylating the BSG by converting acetyl groups into acetic acid, thus eliminating the precursors to acetamide. Acetamide present in the samples was quantified using injecting the acetone extract in Gas chromatography followed by mass spectrometry (GC-MS). The Agilent GC-MS system comprised a 6890N gas chromatograph with an integrated Agilent 7683 auto-sampler and a splitless injector. This was coupled to an Agilent 5973 inert mass spectrometer in EI mode with ionization energy of 69.9 eV (Agilent Technologies, USA). The capillary column used was a DB-Wax 30 m×0.25 mm×0.25 mm (Agilent Technologies, USA). Helium was used as the carrier gas and the flow rate was set at 1.5 ml/min.

The injection volume was 1 microliter, and a solvent delay of 5 min was used to prevent saturation of the detector with the sample solvent. Initially, a spectrum scan (SCAN) of 30-300 amu was used to identify all target analyte peaks. Thereafter, selected ion monitoring (SIM) was applied for quantitative analysis. See "Rapid quantification of major reaction products formed during thermochemical pretreatment of lignocellulosic biomass using GC-MS." James F. Humpulaa, Shishir P. S. Chundawata, Ramin Vismeh, A. Daniel Jones, Venkatesh Balan, Bruce E. Dale, *Journal of Chromatography B*, 879 (2011) 1018-1022. The GC oven temperature profile was adjusted by starting at 50° C. and holding for 1 min, increasing to 100° C. at a rate of 30° C./min and holding for 1 min, increasing to 240° C. at a rate of 38° C./min and holding for 1 min.

Care was taken in the analysis to avoid over-estimation of acetamide levels due to contaminants or side reactions. Appropriate controls were used in all cases.

Results

The results (FIG. 2) show that acetamide levels after alkali plus "COBRA" pretreatment were comparable to untreated BSG. At 2% alkali loading, deacetylation was more efficient when NaOH was used when compared to using $Ca(OH)_2$. At 4% alkali loading both NaOH and $Ca(OH)_2$ performed equally well with the deacetylation reaction.

Conclusion

Extraction of alkali treated BSG prior to "COBRA" treatment helped to reduce acetamide concentration present in treated BSG. At 8% NaOH, lower levels of acetamide were achieved without extraction.

Example 2

Testing was performed according to Scenarios "3," "4" and "5" as shown in FIGS. 3A-3C, respectively. For Scenarios "3" and "4," 8% NaOH and 8% $Ca(OH)_2$ were used for the de-esterification step on wet cake and dried DDGS, respectively. The Scenario "5" testing was performed using 7% $Ca(OH)_2$ on wet cake.

DDGS was obtained from a local brewery and subject to the same densification process as described in Example 1. Moisture content was measured as described in Example 1.

Testing was conducted using the conditions as shown in FIGS. 4A, 4B, 5A, 5B, and 6. The sources for starting materials and equipment used for the de-esterification steps is as described in Example 1.

DDGS de-acetylation reaction was carried out using 8% $Ca(OH)_2$ at 100° C. for 1 hr in a stainless steel reactor.

The whole slurry was allowed to cool down before being transferred to a centrifuge bottle and centrifuged at 10,000 rpm for 30 minutes to move solids from the liquids. The solids were dried in a 50° C. electric oven to bring the moisture content below 10%.

The de-acetylated DDGS (with 10% moisture) sample was subjected to a liquid AFEX pretreatment in a high pressure stainless steel vessel by varying the temperature between 80 to 100° C., the ammonia to biomass loading (1:1 or 1:0.5) for 1 hr. After the AFEX pretreatment, ammonia was released from the vessel and the liquid AFEX-pretreated de-acetylated DDGS sample was transferred to an aluminum tray and dried in the hood overnight to remove residual ammonia.

Enzymatic hydrolysis was carried out using a commercial enzyme (Ctec2, Htec2 and Pectinex) at 15 mg of enzyme loading/g of glucan for 24 hr at 50° C. in a shaking incubator. The hydrolyzed sugar was quantified using HPLC (Shimadzu LC2010) against sugar standards.

Results

Figure 4A:
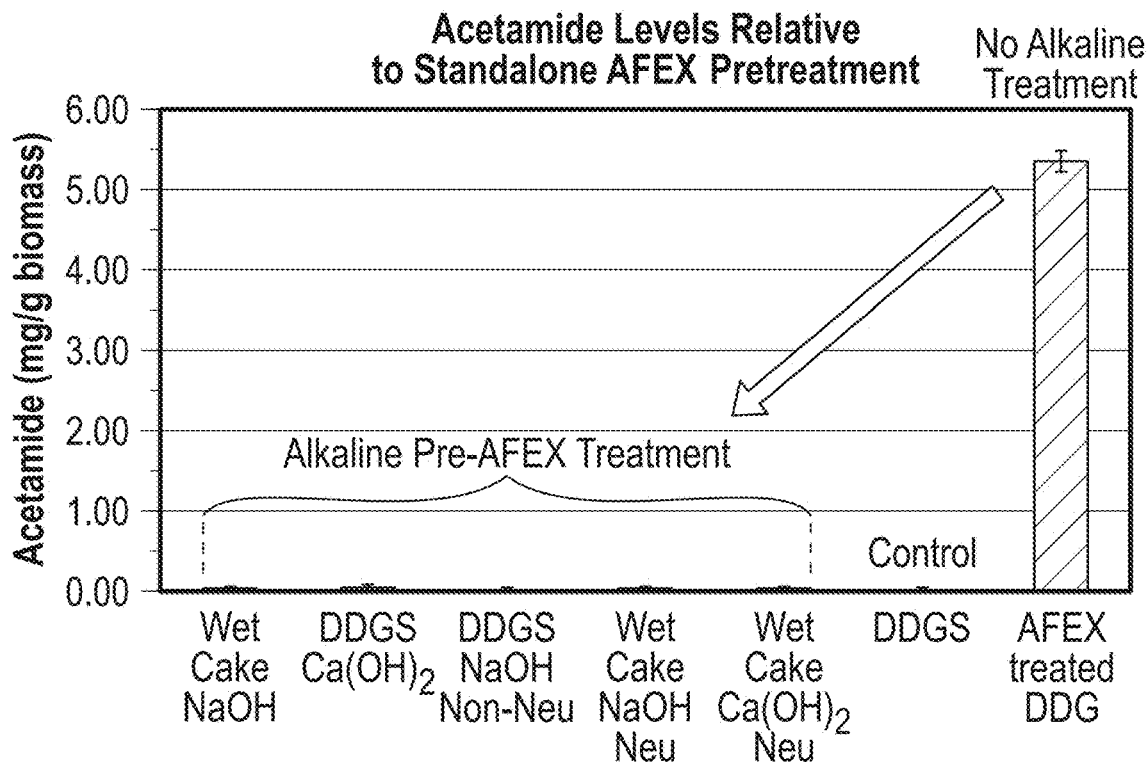
FIGS. 4A and 4B show acetamide levels (mg/g biomass) relative to (A) a control, i.e., standalone liquid Ammonia Fiber Expansion (AFEX) pretreatment with no de-esterification step and (B) with a de-esterification step performed according to Scenarios "3" and "4" as described in FIGS. 3A and 3B, respectively, followed by a liquid AFEX pretreatment step performed at various temperatures and ammonia loadings according to various embodiments.
Figure 4B:
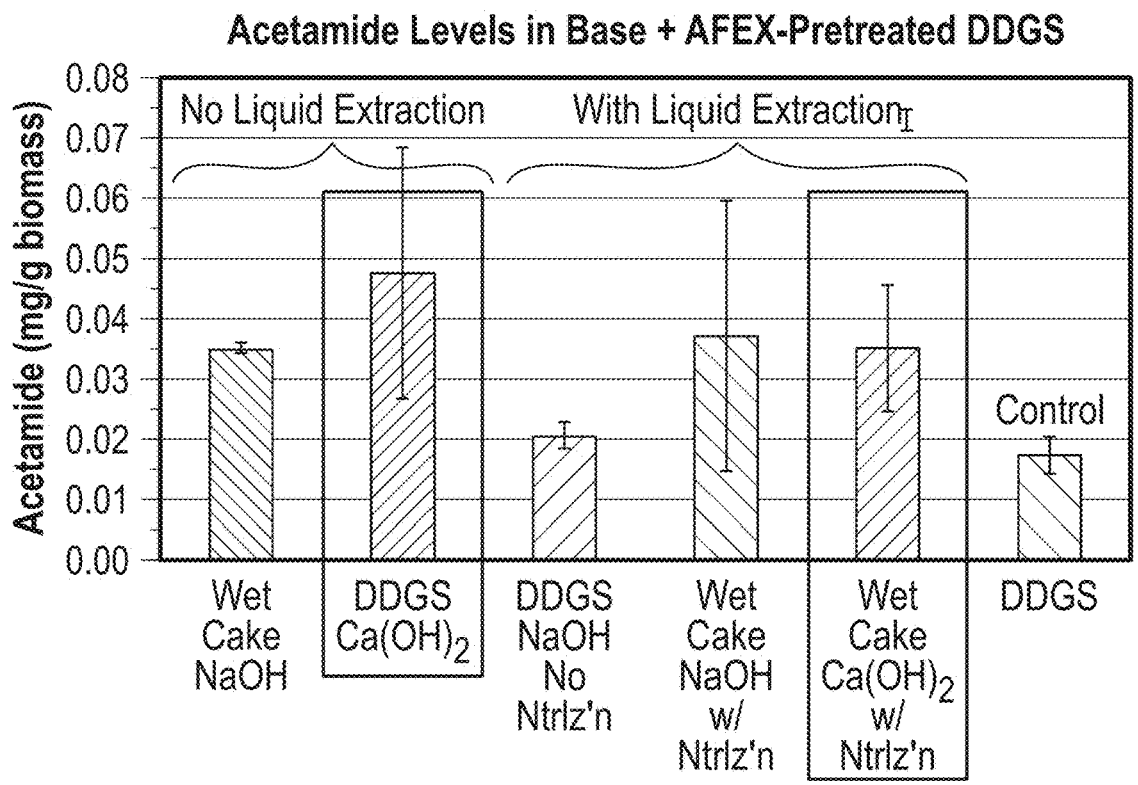

As shown in FIG. 4A, acetamide levels were reduced by over six-fold as compared to a standalone liquid AFEX pretreatment. This testing shows that acetamide levels after a de-esterification step (followed by an AFEX-pretreatment step) were comparable to the levels seen in untreated DDGS. As can be seen in FIG. 4B, testing under both Scenario 1 (no liquid extraction) and 2 (with liquid extraction) with 8% NaOH and $Ca(OH)_2$ produced de-esterified/pretreated wet cakes and DDGS with acetamide levels comparable to untreated DDGS. The samples subjected to a neutralizing step prior to a solid-liquid separation step (prior to the ammonia pretreatment step) further helped to limit formation of acetamide during the ammonia pretreatment. The effect of neutralizing the alkaline slurry prior to solid-liquid separation helped in limiting formation of acetamide during ammonia pretreatment.

Figure 5A:
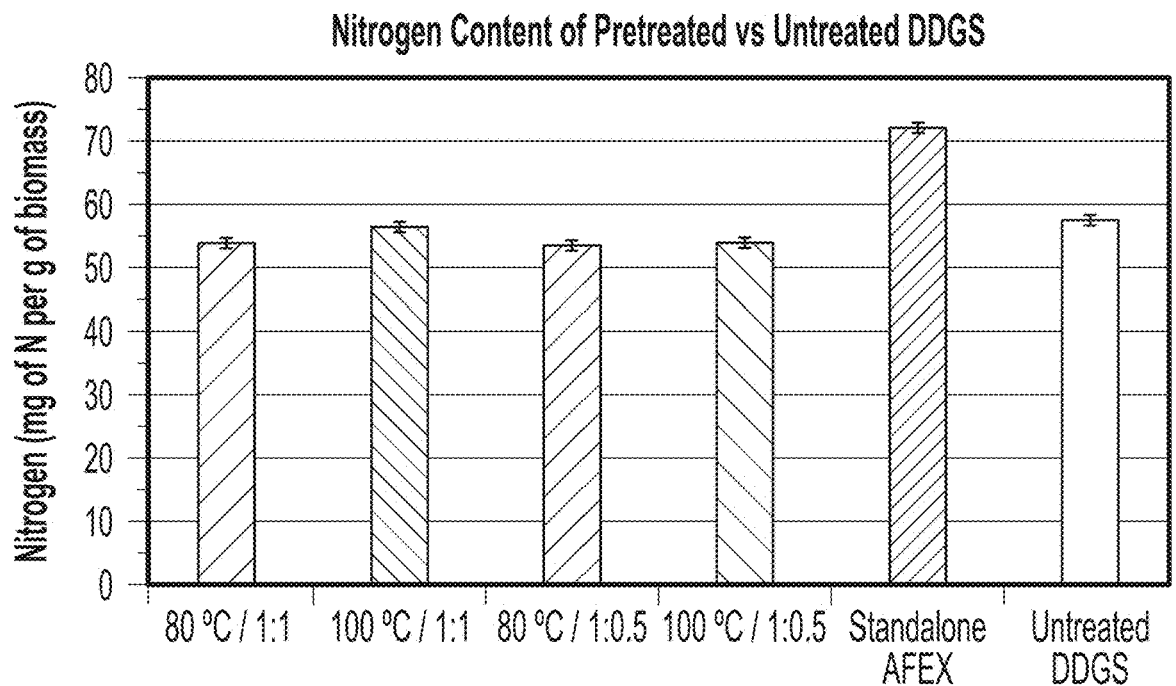
FIGS. 5A and 5B show A) nitrogen content pretreated DDGS subject to a de-esterification step performed according to Scenario "5" as described in FIG. 3C, followed by a liquid AFEX pretreatment step at various temperatures and ammonia loadings, as compared with DDGS subject to a standalone liquid AFEX pretreatment step and to untreated DDGS and (B) average acetamide levels in a wet cake subject to a de-esterification step performed according to Scenario "5" as described in FIG. 3C above, followed by a liquid AFEX pretreatment performed at various temperatures and ammonia loadings, according to various embodiments.
Figure 5B:
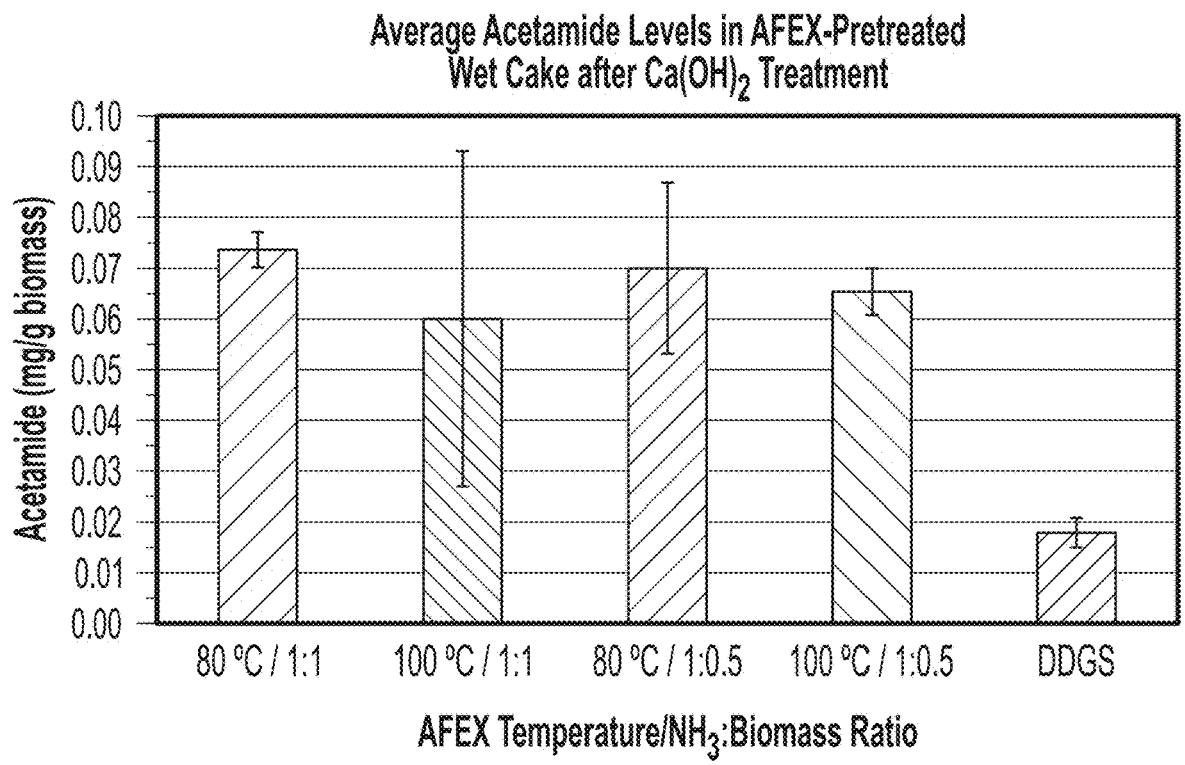

As shown in FIGS. 5A and 5B, the range of ammonia loadings and temperatures tested did not impact acetamide levels and total nitrogen content available in DDGS. Specifically, acetamide levels after 7% $Ca(OH)_2$ treatment (without extraction) and a liquid AFEX pretreatment step are in the same order of magnitude as untreated DDGS. Acetamide levels produced during the AFEX pretreatment step were not significantly impacted by AFEX temperature or ammonia loading.

Figure 6:
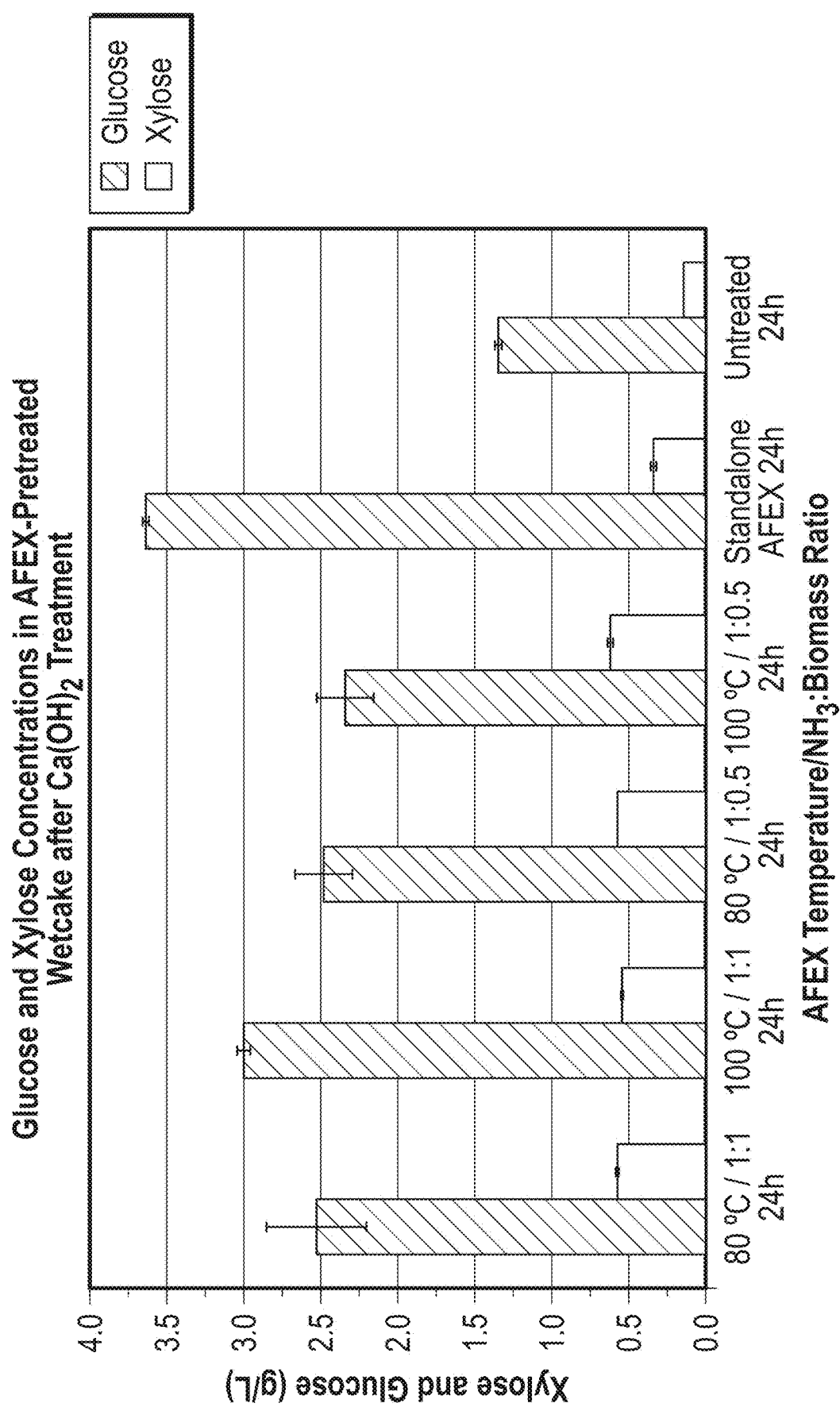
FIG. 6 shows glucose and xylose concentrations in pretreated DDGS subject to a de-esterification followed by a liquid AFEX pretreatment step of DDGS samples subject to a de-esterification step (using $Ca(OH)_2$) performed according to Scenario "3" as described in FIG. 3A, followed by a liquid AFEX pretreatment step at various temperatures and ammonia and enzymatic hydrolysis according to various embodiments.

As shown in FIG. 6, the $Ca(OH)_2$/(Liquid) AFEX pretreatment improved fiber digestibility by at least 1.7 up to 2.2-fold as compared to an untreated wet cake. The $Ca(OH)_2$ treatment also reduced fiber digestibility relative to a standalone AFEX pretreatment.

Figure 7A:
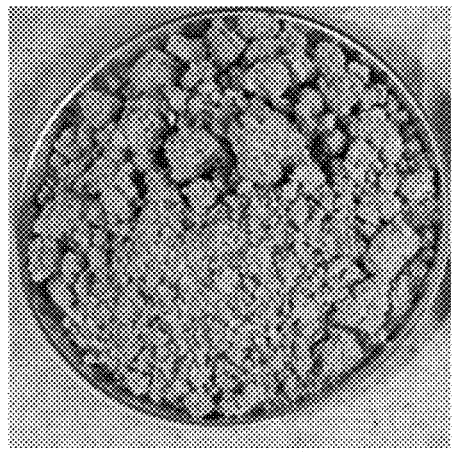
FIGS. 7A and 7B are photographs of A) a light brown/tan colored untreated DDGS and B) a dark brown colored $Ca(OH)_2$/(liquid) AFEX-pretreated DDGS according to an embodiment.
Figure 7B:
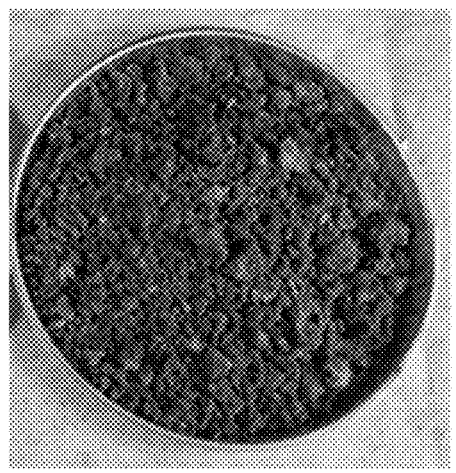

FIGS. 7A and 7B show A) a light brown/tan colored untreated DDGS and B) a dark brown colored $Ca(OH)_2$/AFEX-pretreated DDGS. Darkening of color after AFEX pretreatment is due to the Maillard reaction (i.e., a reaction involving protein and carbohydrate in the presence of alkali).

Example 3 (Prophetic)

Additional testing at various alkali concentrations, temperatures and reaction times will be performed.

Example 4 (Prophetic)

Ammonia pretreatments, such as AFEX pretreatments, are known to improve fiber digestibility and increase protein content in BSG and DDSG by 30 to 50%. As such, rumen and post-rumen in-vitro digestibility studies will be completed to determine the fiber and protein digestibility after these products are subject various pre-esterification/ammonia pretreatment processes. Various alkali will be used with wet cake or DDGS. Testing will also specifically include evaluation of pretreated DDGS for fiber and protein digestibility following $Ca(OH)_2$/AFEX pretreatment of wet cake.

Grasses have acetic acid, ferulic acid, coumaric acid esterified to arabinoxylans and participates with lignin monomers in oxidative coupling pathways to generate different ester-polysaccharide-lignin complexes. Ammonia helps to open up this lignin-carbohydrate-complex (LCC) by cleaving the ester linkages. In this way, biomass digestibility increases by three- to four-fold when combined with commercial enzymes or fed to animals. Some of the nitrogenous compounds that are produced after ammonia treated with biomass include amides (acetamide, coumaroyl amide, feruloyl amide). Since amides are known to be neuro-toxins beyond a certain concentration, their presence in ammonia treated biomass is considered undesirable. In the embodiments described herein, ester linkages are cleaved using a de-esterification reaction by treating the biomass with alkali at varying concentrations prior to ammonia pretreatment. In this way, amide formation in ammonia treated biomass can be limited or eliminated.

In various embodiments, a method of pretreating biomass is provided, comprising de-esterifying the biomass with an alkali to produce de-esterified biomass; and pretreating the de-esterified 1 biomass with ammonia to produce de-esterified ammonia pretreated biomass.

In one embodiment, an amide concentration in the de-esterified ammonia pretreated biomass contains ranges from about 0.04 mg/g biomass to about 25 mg/g biomass. In one embodiment, amide concentration is a reference to an acetamide concentration. In one embodiment, an amide concentration is additionally or alternatively a reference to other amides, such as ferulamide and/or coumaryl amide.

In one embodiment, the amide concentration is substantially zero (i.e., no more than 0.01).

In various embodiments, the de-esterified biomass is neutralized with any suitable neutralizer prior to the pre-treating step, including, but not limited to, concentrated hydrochloric acid or concentrated sulfuric acid.

In various embodiment, the alkali is selected from lime (i.e., $Ca(OH)_2$), KOH, NaOH, or a combination thereof.

Any suitable cellulosic or lignocellulosic biomass can be used. In one embodiment, the cellulosic biomass is brewer's spent grains (BSG) or distiller's dry grain (DDGS). In various embodiments, the lignocellulosic biomass is selected from corn stover, poplar, switchgrass, sugarcane bagasse, wheat straw, sorghum, energy cane, *miscanthus*, soybean meal, and combinations thereof.

In one embodiment, loose cellulosic or lignocellulosic biomass can be used. In one embodiment, the biomass can be densified after the pretreating step to produce densified de-esterified ammonia pretreated biomass.

In one embodiment, the biomass is densified biomass. In one embodiment, the densified biomass can be re-densified following the pretreating step to produce animal feed. In one embodiment, the densified biomass can be re-densified after the de-esterifying step to produce densified de-esterified biomass. In one embodiment, the densified de-esterified biomass is re-densified following the pretreating step, to produce animal feed.

Any suitable ammonia pretreatment step can be used. In one embodiment, the pretreatment step comprises a liquid ammonium hydroxide pretreatment or an ammonia fiber expansion (AFEX) pretreatment. In various embodiments, the AFEX pretreatment is a liquid AFEX pretreatment, a gaseous AFEX pretreatment, or an extractive AFEX pretreatment.

In one embodiment, the pretreatment step comprises a cellulosic conversion liquid ammonia pretreatment (i.e., "COBRA"). In one embodiment, the cellulosic conversion liquid ammonia pretreatment is a densified cellulosic conversion liquid ammonia pretreatment.

Any suitable concentration of alkali can be used, such as from at least 2% to about 8%. In various embodiments, the alkali is present in a concentration of no more than 8%.

In one embodiment, an animal feed is provided comprising de-esterified ammonia pretreated 1 biomass no more than 0.04 mg/g biomass of amides, wherein amide formation is limited by de-esterifying the biomass with an alkali treatment to produce de-esterified biomass; and pretreating the de-esterified biomass with ammonia to produce de-esterified ammonia pretreated biomass.

In one embodiment, a system is provided comprising a reactor for de-esterifying and ammonia pretreating biomass to produce de-esterified ammonia pretreated biomass containing no more than 0.04 mg/g biomass of amides; and a system controller connected to the reactor. The system controller can comprise any control system known in the art for carrying out process steps and necessarily includes any suitable types of computers and monitors, as understood by those skilled in the art. Various types of lines, valves and pumps can also be used as is understood by those skilled in the art.

The de-esterification method described herein can be applied to any agricultural residue or woody biomass to overcome amide formation in any type of ammonia pretreated biomass or in any type of ammonia pretreated cellulosic biomass. Additionally, as noted herein, the de-esterification method can be used with any type of biomass and any conventional ammonia pretreatment process to limit or eliminate amides in the final product. In some embodiments, the de-esterified biomass is neutralized prior to ammonia pretreatment. In some embodiments, the de-esterified biomass is not neutralized prior to ammonia pretreatment. In various embodiments, additional steps, such as hydrolysis and/or fermentation can also be performed on the de-esterified/ammonia pretreated biomass. Since the novel process described herein results in a low level of inhibitor products, microbial inhibition during fermentation can be avoided. The resulting products have a limited amount of amides as compared to ammonia pretreatment processes performed without a prior de-esterification step.

The resulting products are considered highly digestible by ruminant microbes and by biomass-degrading enzymes by those skilled in the art.

Although specific embodiments have been illustrated and described herein, it will be appreciated by those of ordinary skill in the art that any procedure that is calculated to achieve the same purpose may be substituted for the specific embodiments shown. For example, although the process has been discussed using BSG and DDGS, any other type of cellulosic biomass or any type of lignocellulosic biomass can be used. This application is intended to cover any adaptations or variations of the present subject matter. Therefore, it is manifestly intended that embodiments of this invention be limited only by the claims and the equivalents thereof.

What is claimed is:

1. A method of pretreating biomass comprising:
de-esterifying the biomass with an alkali at a concentration from about 2% to 8% alkali in water, to cleave ester linkages to produce de-esterified biomass, wherein the alkali for the de-esterifying the biomass is $Ca(OH)_2$ (lime), KOH, NaOH, or a combination thereof and wherein the alkali to biomass ratio is no greater than 40% (weight/weight);
annealing the de-esterified biomass to reduce the moisture content of solids to less than about 30%; and
without neutralizing the de-esterified biomass, pretreating the de-esterified biomass with ammonia to produce de-esterified ammonia pretreated biomass, wherein the ammonia to biomass ratio is between about 0.5:1 to about 1:1,
the method resulting in an amide concentration range in the de-esterified ammonia pretreated biomass from substantially zero mg/g biomass to about 25 mg/g biomass.

2. The method of claim 1 wherein the amide concentration ranges from about 0.04 mg/g biomass to about 25 mg/g biomass.

3. The method of claim 1 wherein the pretreating biomass is pretreating densified biomass.

4. The method of claim 1 wherein the pretreating with ammonia reduces density in the de-esterified biomass to produce reduced-density biomass, and the method further includes re-densifying the reduced-density biomass following the pretreating with ammonia to produce animal feed.

5. The method of claim 1 wherein the pretreating step comprises a liquid ammonium hydroxide pretreatment or an ammonia fiber expansion (AFEX) pretreatment.

6. The method of claim 5 wherein the AFEX pretreatment is a liquid AFEX pretreatment, a gaseous AFEX pretreatment, or an extractive AFEX pretreatment.

7. The method of claim 1 wherein the biomass is brewer's spent grains (BSG) or distiller's dry grain DDGS.

8. The method of claim 1 wherein the biomass is lignocellulosic biomass.

9. The method of claim 8 wherein the lignocellulosic biomass is selected from corn stover, poplar, switchgrass, sugarcane bagasse, wheat straw, sorghum, energy cane, *miscanthus*, soybean meal, and combinations thereof.

10. The method of claim 8 wherein the pretreating step comprises a cellulosic conversion liquid ammonia pretreatment.

11. The method of claim 10 wherein the cellulosic conversion liquid ammonia pretreatment is a densified cellulosic conversion liquid ammonia pretreatment.

12. The method of claim 1 wherein the alkali is present in a concentration from 3% to about 8%.

13. The method of claim 1 wherein the alkali is present in a concentration from 3% to about 6%.

14. A method of pretreating biomass comprising:
de-esterifying the biomass with an alkali at a concentration from about 2% to 8% alkali in water, to cleave ester linkages to produce de-esterified biomass, wherein the alkali for the de-esterifying the biomass is $Ca(OH)_2$ (lime), KOH, NaOH, or a combination thereof and wherein the alkali to biomass ratio is no greater than 40%, weight/weight;
annealing the de-esterified biomass to reduce the moisture content to less than about 30%; and
pretreating the de-esterified biomass with ammonia to produce de-esterified ammonia pretreated biomass, wherein the ammonia used in the pretreating step is reduced compared to an amount of ammonia used when pretreating biomass that has not been de-esterified, wherein the ammonia to biomass ratio is between about 0.5:1 to about 1:1,
the method resulting in an amide concentration in the de-esterified ammonia pretreated biomass ranges from substantially zero mg/g biomass to about 25 mg/g biomass.

15. The method of claim 14 wherein the ammonia is reduced by up to 5% compared to the amount of ammonia used when pretreating biomass that has not been de-esterified.

16. The method of claim 14 wherein the de-esterified biomass is neutralized with concentrated hydrochloric acid or concentrated sulfuric acid prior to the pretreating the de-esterified biomass with ammonia step.

* * * * *